(12) United States Patent
Hirota

(10) Patent No.: US 10,432,902 B2
(45) Date of Patent: Oct. 1, 2019

(54) INFORMATION PROCESSING DEVICE AND INFORMATION PROCESSING METHOD

(71) Applicant: SONY CORPORATION, Tokyo (JP)

(72) Inventor: Yoichi Hirota, Kanagawa (JP)

(73) Assignee: SONY CORPORATION, Tokyo (JP)

(*) Notice: Subject to any disclaimer, the term of this patent is extended or adjusted under 35 U.S.C. 154(b) by 45 days.

(21) Appl. No.: 15/554,760

(22) PCT Filed: Mar. 3, 2016

(86) PCT No.: PCT/JP2016/056616
§ 371 (c)(1),
(2) Date: Aug. 31, 2017

(87) PCT Pub. No.: WO2016/147888
PCT Pub. Date: Sep. 22, 2016

(65) Prior Publication Data
US 2018/0241978 A1    Aug. 23, 2018

(30) Foreign Application Priority Data
Mar. 17, 2015  (JP) .................................. 2015-053224

(51) Int. Cl.
*H04N 9/31*       (2006.01)
*H04N 5/74*       (2006.01)
(Continued)

(52) U.S. Cl.
CPC .......... *H04N 9/3194* (2013.01); *G06T 7/521* (2017.01); *G06T 7/70* (2017.01); *H04N 5/74* (2013.01);
(Continued)

(58) Field of Classification Search
CPC .......... H04N 9/3194; H04N 5/74; H04N 9/31; G06T 7/521; G06T 7/70
See application file for complete search history.

(56) References Cited

U.S. PATENT DOCUMENTS 9,348,212 B2 *  5/2016  Ishikawa ................ G03B 41/00
9,661,257 B2 *  5/2017  Ishikawa ................ G06T 3/005
(Continued)

FOREIGN PATENT DOCUMENTS

CN       103733248 A      4/2014
JP       2005-051375 A    2/2005
(Continued)

OTHER PUBLICATIONS

International Search Report and Written Opinion of PCT Application No. PCT/JP2016/056616, dated May 31, 2016, 11 of ISRWO.
(Continued)

*Primary Examiner* — Mishawn N. Hunter
(74) *Attorney, Agent, or Firm* — Chip Law Group

(57) ABSTRACT

The present technology relates to an information processing device and an information processing method, capable of inhibiting corresponding-point detection accuracy from degrading. The information processing device according to the present technology, allows a projecting unit to project a second pattern including a first pattern including repetition in first cycles in a first direction, inverted in phase in second cycles in a second direction orthogonal to the first direction, in order to acquire corresponding relationship in pixel between the projecting unit and a capturing unit. The present technology can be applied to an electronic instrument including the function of a projector or the functions of both a projector and a camera, and a computer that controls the functions.

19 Claims, 28 Drawing Sheets

(51) Int. Cl.
  *G06T 7/521*   (2017.01)
  *G06T 7/70*    (2017.01)
(52) U.S. Cl.
  CPC ............. *H04N 9/31* (2013.01); *H04N 9/3185* (2013.01); *G06T 2207/10024* (2013.01)

(56) References Cited

U.S. PATENT DOCUMENTS

| | | | |
|---|---|---|---|
| 2009/0207185 A1* | 8/2009 | Furui ................... | H04N 9/3185 345/619 |
| 2013/0222776 A1 | 8/2013 | Ishikawa | |
| 2013/0229666 A1* | 9/2013 | Suzuki ................. | G01B 11/026 356/610 |
| 2013/0242090 A1 | 9/2013 | Yoshikawa | |
| 2014/0168376 A1 | 6/2014 | Hasegawa et al. | |

FOREIGN PATENT DOCUMENTS

| | | |
|---|---|---|
| JP | 2012-127821 A | 7/2012 |
| JP | 2013-041167 A | 2/2013 |
| JP | 2013-108944 A | 6/2013 |
| JP | 2013-172444 A | 9/2013 |
| WO | 2012/081506 A1 | 6/2012 |
| WO | 2013/024794 A1 | 2/2013 |

OTHER PUBLICATIONS

Salvi, et al., "A State of the Art in Structured Light Patterns for Surface Profilometry", Pattern Recognition, Mar. 18, 2010, 36 pages.

* cited by examiner

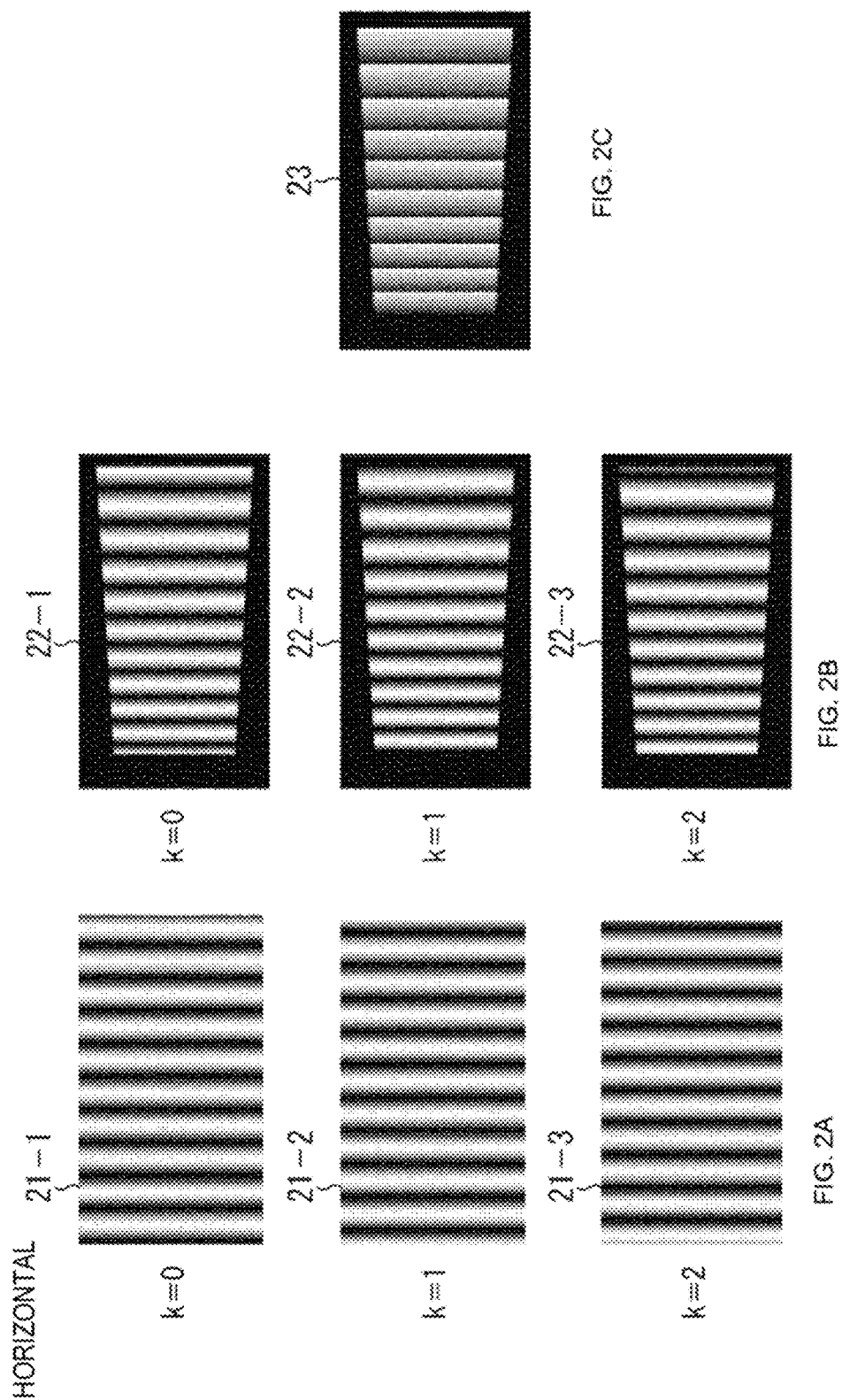

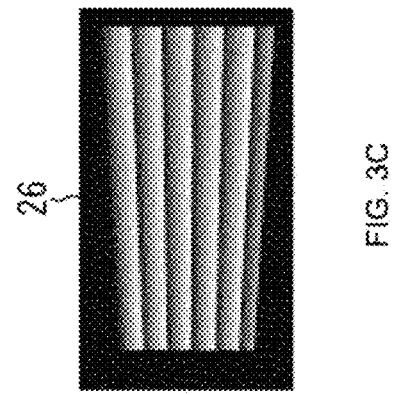
FIG. 3C
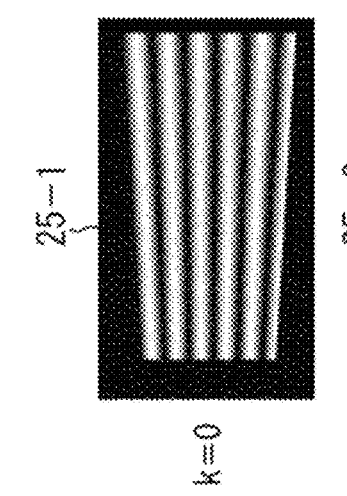
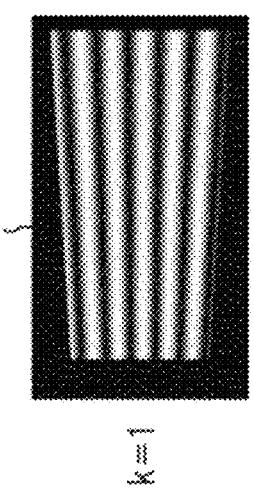
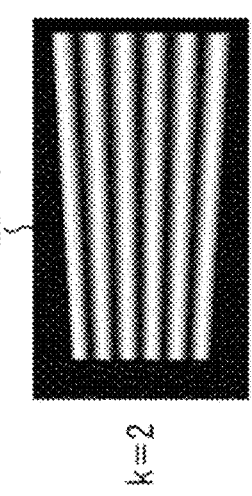
FIG. 3B
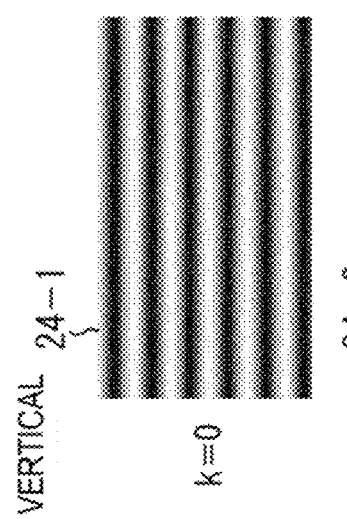
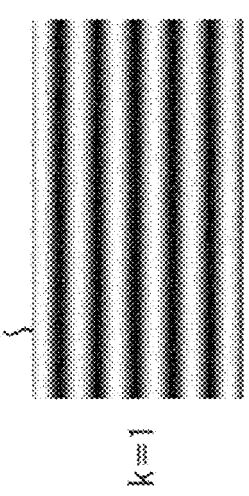
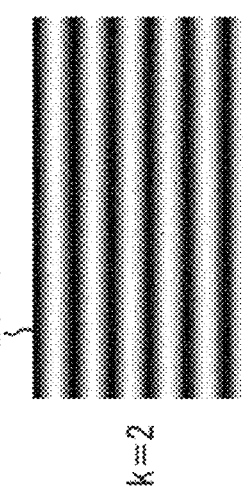
FIG. 3A

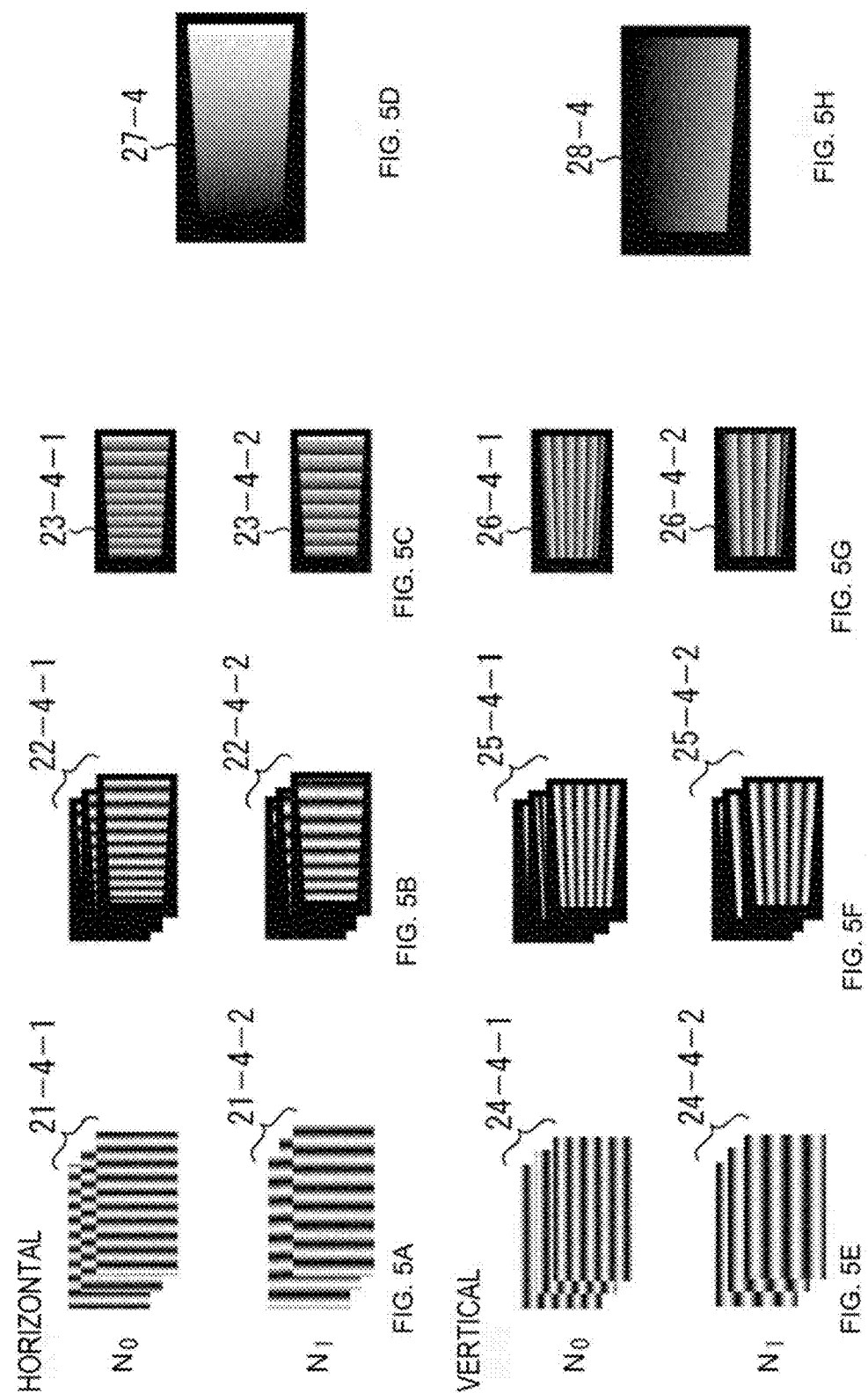

NON-INVERTED REGION

INVERTED REGION

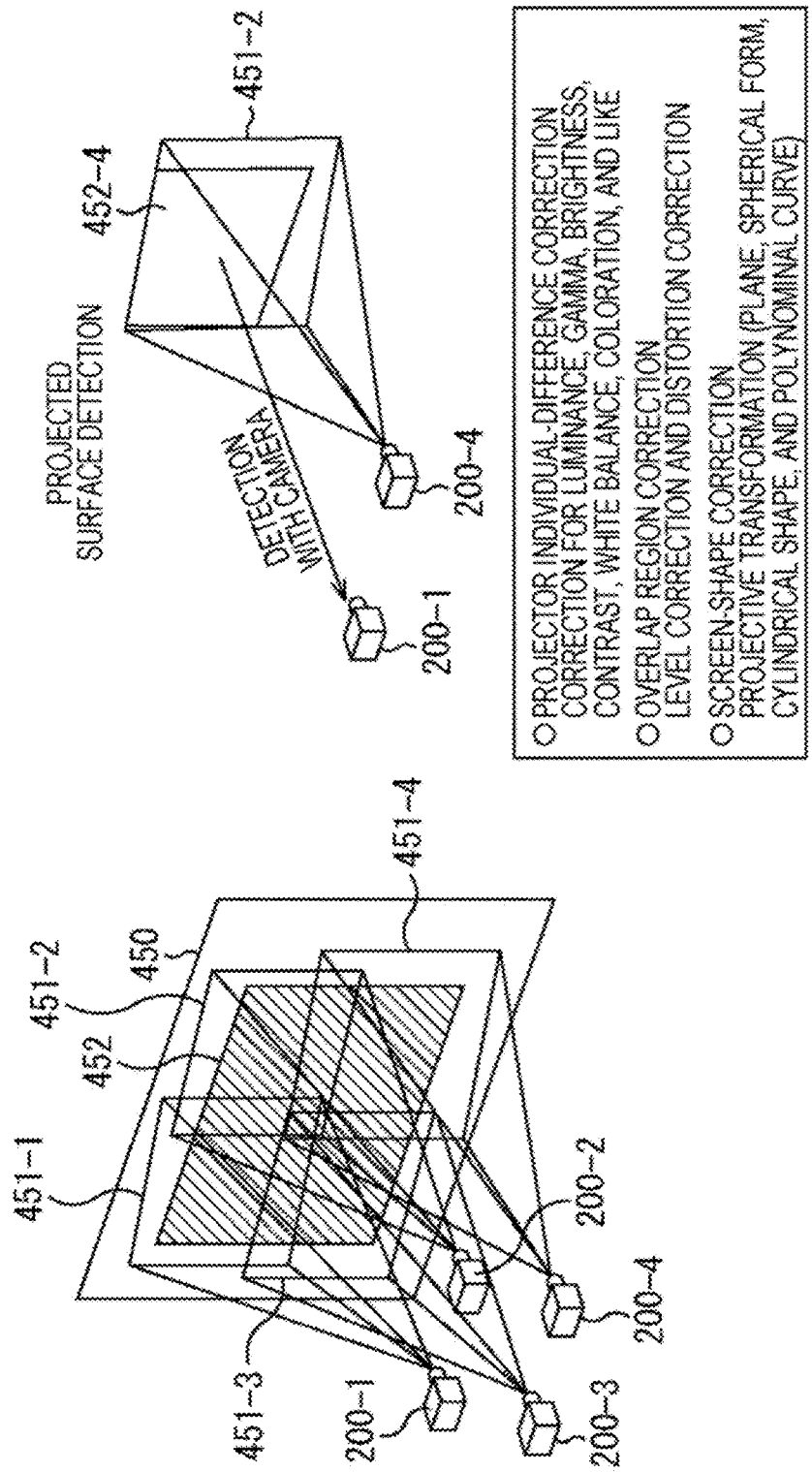

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/056616 filed on Mar. 3, 2016, which claims priority benefit of Japanese Patent Application No. JP 2015-053224 filed in the Japan Patent Office on Mar. 17, 2015. Each of the above-referenced applications is hereby incorporated herein by reference in its entirety.

TECHNICAL FIELD

The present technology relates to an information processing device and an information processing method, and particularly relates to an information processing device and an information processing method, capable of inhibiting corresponding-point detection accuracy from degrading.

BACKGROUND ART

Conventionally, there is a method of reducing the distortion or the like of a projected image by capturing a projected image projected onto a projected surface by a projector, by a camera, performing geometric correction or the like to an image to be projected with the captured image. In a case where this method is used, a corresponding point between the projected image projected by the projector and the captured image acquired by the camera (namely, a corresponding point in pixel between the projector and the camera) is necessary to detect previously. Various methods have been considered as a method of detecting the corresponding point and, for example, a phase-shift method has been considered (e.g., refer to Non-Patent Document 1).

CITATION LIST

Non-Patent Document

Non-Patent Document 1: J. Salvi, S. Fernandez, T. Pribanic, X. Llado, "A State of the Art in Structured Light Patterns for Surface Profilometry", Pattern Recognition, Volume 43, Issue 8, August 2010, Pages 2666-2680

SUMMARY OF THE INVENTION

Problems to be Solved by the Invention

However, for the phase-shift method, phase detection cannot be correctly performed due to asynchronous noise occurring in the captured image of the projected image so that there is a risk that an error occurs in corresponding-point detection. In addition, for the phase-shift method, when the projected surface includes a plurality of surfaces, a pattern image projected onto one surface is reflected from the projected surface so as to be projected on adjacent other surfaces so that there is a risk that an error occurs in the corresponding-point detection.

The present technology has been proposed in consideration of the situations, and an object of the present technology is to inhibit corresponding-point detection accuracy from degrading.

Solutions to Problems

According to one aspect of the present technology, an information processing device includes: a projection control unit configured to allow a projecting unit to project a second pattern including a first pattern including repetition in first cycles in a first direction, inverted in phase in second cycles in a second direction orthogonal to the first direction, in order to acquire corresponding relationship in pixel between the projecting unit and a capturing unit.

The first pattern can be made to include a predetermined parameter sinusoidally varying.

The parameter can be made to be luminance.

The first direction can be made to be different from a direction in which a phase is detected.

The first direction can be made to slant at an angle in a predetermined range with respect to a vertical direction in a captured image captured and acquired by the capturing unit.

The range can be made to be between 40° to 50°.

The projection control unit can allow the projecting unit to project a third pattern including repetition in the second cycles in the second direction and a fourth pattern including the third pattern inverted in phase before the second pattern is projected.

The third pattern and the fourth pattern can include binary repeated in the second cycles in the second direction, the binary including mutually opposite phases.

The projection control unit can further allow the projecting unit to project a fifth pattern including the first pattern including the repetition in the first cycles in the second direction, inverted in phase in the second cycles in the first direction.

The projection control unit can allow the projecting unit to project a plurality of the second patterns including the first patterns mutually shifted in phase.

The projection control unit can allow the projecting unit to project a trio of the second patterns including the first patterns mutually shifted by 120° in phase.

The projection control unit can allow the projecting unit to project images of a plurality of the second patterns including the first cycles different from each other.

A generating unit configured to generate the second pattern, is further provided, and the projection control unit can allow the projecting unit to project the second pattern generated by the generating unit.

The generating unit inverts the first pattern including the repetition in the first cycles in the first direction, in phase in the second cycles in the second direction so as to be able to generate the second pattern.

The generating unit varies a repeating direction of the first pattern including the repetition in the first cycles to the first direction and further inverts the first pattern in phase in the second cycles in the second direction so as to be able to generate the second pattern.

A storage unit configured to store data of the first patterns, is further provided, and the generating unit can generate the second patterns with the first patterns stored in the storage unit.

The projecting unit is further provided, and the projecting unit can project the second pattern onto a projected surface in accordance with the control of the projection control unit.

The capturing unit is further provided, and the capturing unit can capture a projected image of the second pattern projected by the projecting unit so as to be able to acquire a captured image.

A corresponding-point detecting unit can be further provided, the corresponding-point detecting unit configured to detect a corresponding point in pixel between the projecting unit and the capturing unit with a captured image of a projected image of the second pattern projected by the projecting unit, the captured image being acquired by the capturing unit.

According to one aspect of the present technology, an information processing method includes: allowing a projecting unit to project a second pattern including a first pattern including repetition in first cycles in a first direction, inverted in phase in second cycles in a second direction orthogonal to the first direction, in order to acquire corresponding relationship in pixel between the projecting unit and a capturing unit.

According to one aspect of the present technology, a projecting unit projects a second pattern including a first pattern including repetition in first cycles in a first direction, inverted in phase in second cycles in a second direction orthogonal to the first direction, in order to acquire corresponding relationship in pixel between the projecting unit and a capturing unit.

Effects of the Invention

According to the present technology, the information processing can be performed. In addition, according to the present technology, the corresponding-point detection accuracy can be inhibited from degrading.

BRIEF DESCRIPTION OF DRAWINGS

FIGS. 2A, 2B and 2C are diagrams for describing the phase-shift method.

FIGS. 3A, 3B and 3C are diagrams for describing the phase-shift method.

FIGS. 5A, 5B, 5C, 5D, 5E, 5F, 5G and 5H are diagrams for describing a multi-phase-shift method.

FIGS. 25A and 25B are views of the state of image projection.

MODE FOR CARRYING OUT THE INVENTION

Figure 1:
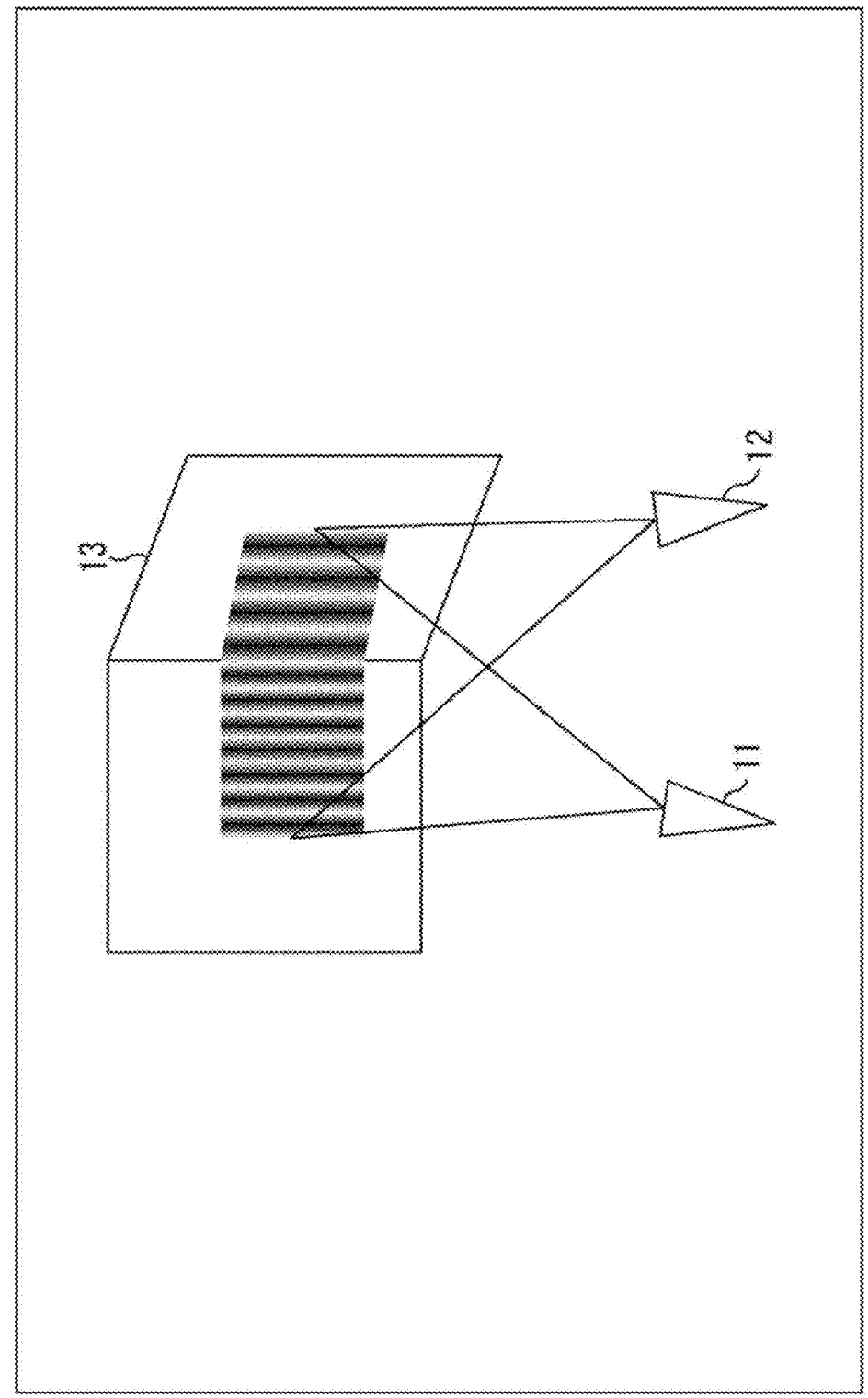
FIG. 1 is a diagram for describing a phase-shift method.

Modes for carrying out the present disclosure (hereinafter, referred to as embodiments) will be described below. Note that the descriptions will be given in the following order.

1. Phase-Shift Method
2. First Embodiment (Projection Control and Corresponding-Point Detection)
3. Second Embodiment (Image Projecting and Capturing Device)
4. Third Embodiment (Applications)

<1. Phase-Shift Method>

<Corresponding-Point Detection of Active Stereo Sensing>

Recently, a technology of projecting video onto a non-plane (a solid plane including a plurality of planes, a curved surface such as a planetarium, or a more intricate shape such as the interior of a room or a construct) with a plurality of projectors, has considerably attracted attention. For the projection, for example, there is a need to perform geometric correction or the like in response to the shape of an object to be projected. In addition, a technology of reducing the distortion of a projected image with the geometric correction or the like even when such a projector is installed with an arbitrary attitude with respect to a projected surface, has been considered.

Conventionally, there is a method of capturing a projected image projected onto a projected surface by a projector, by a camera, for the geometric correction or the like. For this method, correction is performed to an image to be projected, with the captured image of the projected image, acquired by the camera.

For the method of performing the correction with the captured image of the projected image, a corresponding point between the projected image projected by the projector and the captured image acquired by the camera (namely, between a pixel of the projector and a pixel of the camera) is necessary to detect previously, in order to perform the correction correctly. Various methods have been proposed as a method of detecting the corresponding point, and, as approximate classification, there is a difference of whether a coarsely quantized discrete value or an analog continuous value is used in terms of signal levels. Furthermore, there is a difference between space coding of embedding a uniquely identifiable pattern into a projected image and time coding of embedding a pattern into the projected image in response to a variation in time.

A method of using the discrete value and the space coding, makes separation of a signal simple and is resistant to noise because of being discrete, but a load is considerably high as signal processing since pattern matching occurs, and, furthermore, acquisition of the corresponding point is made coarse and false recognition occurs due to occlusion.

A method of using the discrete value and the time coding, is resistant to noise, and signal processing is light since only a variation in time for each pixel is monitored, but the number of projected images considerably increases in order to acquire the corresponding point densely.

A method of using the continuous value and the time coding, easily receives influence, such as noise and the input/output response characteristic of a device, but the corresponding point can be acquired densely. In addition, the number of projected images is relatively small, and a load is low as signal processing.

A phase-shift (PS) method and a multi-phase-shift (MPS) method have been considered as the method of using the continuous value and the time coding. Since having the features described above, the phase-shift method and the multi-phase-shift method are also used in a case where object shape measurement is required with high precision at close range, such as a three-dimensional measurement instrument for professional use other than the projector/camera system described above.

<Outline of Phase-Shift Method>

An outline of the phase-shift method will be described below. In the phase-shift method, as illustrated in FIG. 1, a projector (PJ) 11 projects a sinusoidal pattern in luminance in a predetermined direction (a pattern varying in luminance with a sinusoidal pattern in a predetermined direction) onto a projected surface 13, and a camera (CAM) 12 captures a projected image projected onto the projected surface 13 so that a corresponding point is detected with the captured image of the projected image.

<Corresponding-Point Detection>First, processing is performed with a sinusoidal pattern in luminance in a horizontal direction. The projector 11 projects, for example, three patterns each including a sinusoidal variation in luminance in the same cycles in the horizontal direction, with a mutual phase difference of 120° (a mutual shift of 120° in phase), such as a sinusoidal pattern 21-1 (k=0), a sinusoidal pattern 21-2 (k=1), and a sinusoidal pattern 21-3 (k=2) illustrated in FIG. 2A. The patterns are referred to as sinusoidal patterns 21 in a case where there is no need to describe the patterns to be mutually distinguished, below.

When each pixel in the projector 11 is defined to be $(x_{pj}, y_{pj})$, the sinusoidal patterns 21 are defined to be $I_{pj, k}$, the maximum pixel value of the sinusoidal patterns 21 is defined to be $x_{pj, max}$, and the number of sinusoidal waves in each sinusoidal pattern 21 (the number of repeated times) is defined to be N, the pixel value $I_{pj, k}(x_{pj}, y_{pj})$ of the pixel $(x_{pj}, y_{pj})$ in the sinusoidal patterns 21 can be expressed by the following Expression (1).

[Mathematical Formula 1]

$$I_{pj,k}(x_{pj}, y_{pj}) = 0.5A\left(1 + \sin\left(N\phi(x_{pj}) + \frac{2\pi}{3}k\right)\right) \quad (1)$$

Here, the phase $\phi(x_{pj})$ at coordinates $x_{pj}$ can be expressed by the following Expression (2).

[Mathematical Formula 2]

$$\phi(x_{pj})=2\pi x_{pj}/x_{pj,max} \quad (2)$$

where k=0, 1, and 2, and $I_{pj, k}$ (namely, $I_{pj, 0}$, $I_{pj, 1}$, and $I_{pj, 2}$) The camera 12 captures projected images of the sinusoidal patterns 21 so as to acquire, for example, a captured image 22-1 (k=0), a captured image 22-2 (k=1), and a captured image 22-3 (k=2) illustrated in FIG. 2B. The captured images are referred to as captured images 22 in a case where there is no need to described the captured images to be mutually distinguished, below. When the pixel value of the captured images 22 captured by the camera 12 is defined to be $I_{cam, k}$ (namely, $I_{cam, 0}$, $I_{cam, 1}$, $I_{cam, 2}$) and each pixel of the camera 12 is defined to be $(x_{cam}, y_{cam})$, the phase $\phi'(x_{cam}, y_{cam})$ in each pixel $(x_{cam}, y_{cam})$ can be acquired by the following Expressions (3) to (5) with the pixel value $I_{cam, k}(X_{cam}, y_{cam})$ of the captured images 22 in each pixel $(X_{cam}, y_{cam})$.

[Mathematical Formula 3]

$$E=(2I_{cam,0}(x_{cam}, y_{cam})-I_{cam,1}(x_{cam}, y_{cam})-I_{cam,2}(x_{cam}, y_{cam}))/3 \quad (3)$$

[Mathematical Formula 4]

$$F=(-I_{cam,1}(X_{cam}, y_{cam})+I_{cam,2}(x_{cam}, y_{cam}))/\sqrt{3} \quad (4)$$

[Mathematical Formula 5]

$$\phi'(x_{cam}, y_{cam})=a\tan2(E, F) \quad (5)$$

A distribution in phase in each pixel of the camera 12 is made to be a phase distribution 23 illustrated in FIG. 2C. That is, a phase distribution of 0 to $2\pi$ is repeated N times in the horizontal direction in response to the repetition of the sinusoidal wave in the sinusoidal patterns 21.

Next, similar processing is performed with a sinusoidal pattern in luminance in a vertical direction. The projector 11 projects, for example, three patterns each including a sinusoidal variation in luminance in the same cycles in the vertical direction, with a mutual phase difference of 120° (a mutual shift of 120° in phase), such as a sinusoidal pattern 24-1 (k=0), a sinusoidal pattern 24-2 (k=1), and a sinusoidal pattern 24-3 (k=2) illustrated in FIG. 3A. The patterns are referred to as sinusoidal patterns 24 in a case where there is no need to describe the patterns to be mutually distinguished, below.

The camera 12 captures projected images of the sinusoidal patterns 24 so as to acquire, for example, a captured image 25-1 (k=0), a captured image 25-2 (k=1), and a captured image 25-3 (k=2) illustrated in FIG. 3B. The captured images are referred to as captured images 25 in a case where there is no need to described the captured images to be mutually distinguished, below. The phase $\phi'(x_{cam}, y_{cam})$ in each pixel $(x_{cam}, y_{cam})$ of the camera 12 can be acquired with the captured images 25 by a method similar to that in the horizontal direction described above.

In this case, a distribution in phase in each pixel of the camera 12 is made to be a phase distribution 26 illustrated in FIG. 3C. That is, a phase distribution of 0 to $2\pi$ is repeated N times in the vertical direction in response to the repetition of the sinusoidal wave in the sinusoidal patterns 24.

<Phase Unwrapping>

Figure 4C:
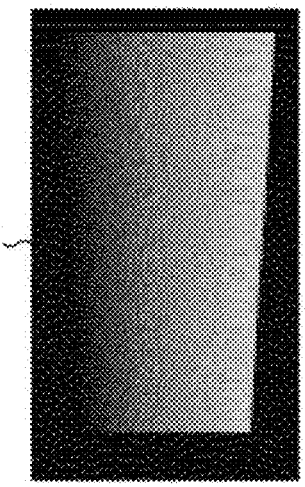
FIGS. 4A, 4B and 4C are diagrams for describing the phase-shift method.
Figure 4B:
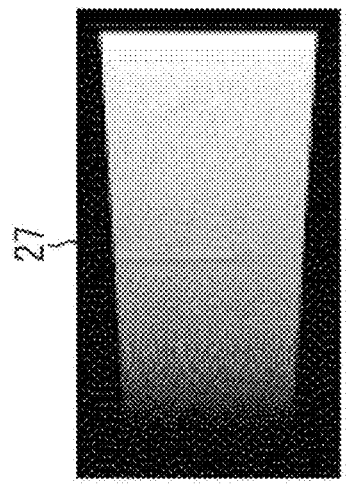
Figure 4A:
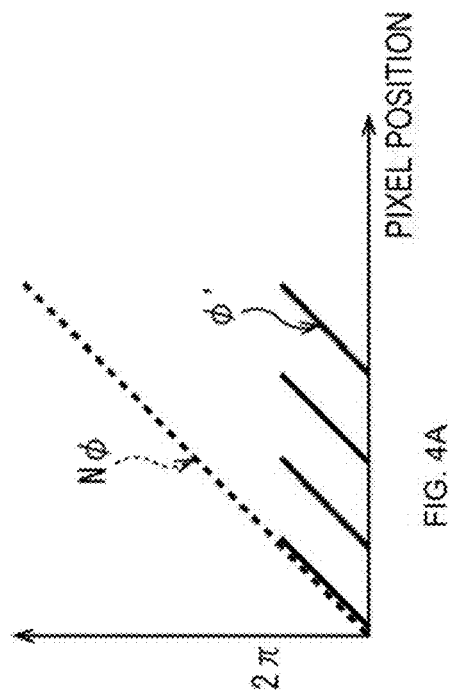

The phase $\phi'$ includes the phase $N\phi$ of an original sinusoidal wave with a constraint of 0 to $2\pi$(each solid line in a graph in FIG. 4A) so that performing phase unwrapping processing of solving the connectivity in phase between adjacent pixels as illustrated in FIG. 4A, can acquire the original phase $N\phi$ (a broken line in the graph in FIG. 4A). For example, the phase unwrapping in the horizontal direction is performed to the phase distribution 23 illustrated in FIG. 2C so that a phase distribution 27 illustrated in FIG. 4B is acquired. Similarly, the phase unwrapping in the vertical direction is performed to the phase distribution 26 illustrated in FIG. 3C so that a phase distribution 28 illustrated in FIG. 4C is acquired.

With this arrangement, the pixel ($x_{cam}$, $y_{cam}$) of the camera 12 and the pixel ($x_{pj}$, $y_{pj}$) of the projector 11 are associated on a one-to-one basis. For example, on the basis of the phase distribution 27, the horizontal pixel $x_{pj}$ of the projector 11 corresponding to the pixel ($x_{cam}$, $y_{cam}$) of the camera 12, can be acquired by the following Expression (6).

[Mathematical Formula 6]

$$x_{pj}(x_{cam}, y_{cam}) = x_{pj,max} N \phi(x_{cam}, y_{cam}) / 2\pi N \quad (6)$$

Rightfully, the coordinates in the vertical direction can be similarly acquired on the basis of the phase distribution 28.

Examples of notable points of the phase-shift method, include a point in which a projector pixel is acquired per unit sub-pixel and a point in which influence due to the focus of the projector or the camera is barely received, by using a continuously smooth pattern, and a point in which no influence of the reflected light intensity on the projected surface, is theoretically received and a degree of amplitude is at least extracted, with the phase being used. Note that the saturation in luminance of the camera and the influence of the gamma response characteristic of the projector/camera, are easily received so that a stable environment is important to ensure.

<Outline of Multi-Phase-Shift Method>

Next, the multi-phase-shift method will be described. For the multi-phase-shift method, measurement is performed twice with the phase-shift method with a set of a pattern including repeating cycles with the number $N_0$ of sinusoidal waves and a pattern including repeating cycles with the number $N_1$ of sinusoidal waves, the numbers $N_0$ and $N_1$ being relatively prime. With this arrangement, the phase unwrapping can be performed without uncertainty, on the basis of constraint conditions for the mutual phases $\phi_0$ and $\phi_1$.

<Corresponding-Point Detection>For example, in the corresponding-point detection in the horizontal direction, the projector 11 projects each sinusoidal pattern 21 in a sinusoidal pattern group 21-4-1 (the number No of sinusoidal waves, k=0 to 2) and each sinusoidal pattern 21 in a sinusoidal pattern group 21-4-2 (the number N1 of sinusoidal waves, k=0 to 2) illustrated in FIG. 5A.

The camera 12 captures the projected images of the sinusoidal patterns 21 so as to acquire, for example, a captured image group 22-4-1 (the number $N_0$ of sinusoidal waves, k=0 to 2) and a captured image group 22-4-2 (the number N1 of sinusoidal waves, k=0 to 2) illustrated in FIG. 5B.

Then, a phase distribution 23-4-1 in phase $\phi'_0$ is acquired from the captured image group 22-4-1, and a phase distribution 23-4-2 in phase $\phi'_1$ is acquired from the captured image group 22-4-2.

The phase $\phi'_0$ and the phase $\phi'_1$ can be similarly acquired for the horizontal direction. For example, the projector 11 projects each sinusoidal pattern 24 in a sinusoidal pattern group 24-4-1 (the number N0 of sinusoidal waves, k=0 to 2) and each sinusoidal pattern 21 in a sinusoidal pattern group 24-4-2 (the number $N_1$ of sinusoidal waves, k=0 to 2) illustrated in FIG. 5E, and the camera 12 captures the projected images of the sinusoidal patterns 21 so as to acquire, for example, a captured image group 25-4-1 (the number $N_0$ of sinusoidal waves, k=0 to 2) and a captured image group 25-4-2 (the number $N_1$ of sinusoidal waves, k=0 to 2) illustrated in FIG. 5F. Then, a phase distribution 26-4-1 in the phase $\phi'_0$ is acquired from the captured image group 25-4-1, and a phase distribution 26-4-2 in the phase $\phi'_0$ is acquired from the captured image group 25-4-2.

Figure 6A:
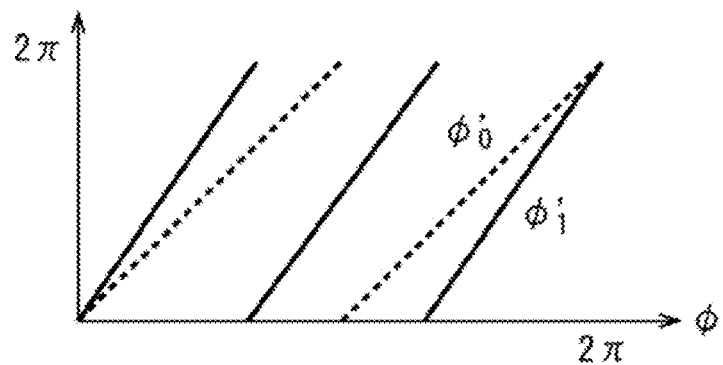
FIGS. 6A and 6B are diagrams for describing the multi-phase-shift method.

When the following expressions are satisfied: $N_0=2$ and $N_1=3$, the relationship between the phase $\phi$ for uniquely acquiring the corresponding point, the phase $\phi'_0$, and the phase $\phi'_1$, is indicated with a graph illustrated in FIG. 6A. That is, the phase $\phi$ can be uniquely acquired from the phase $\phi'_0$ and the phase $\phi'_1$.

The relationship between the phase $\phi$, the phase $\phi'_0$, and the phase $\phi'_1$, can be expressed by the following Expression (7).

[Mathematical Formula 7]

$$\phi = \frac{(\phi'_0 + 2\pi j)}{N_0} = \frac{(\phi'_1 + 2\pi j)}{N_1} \quad (7)$$

$i, j \in$ integer

Figure 6B:
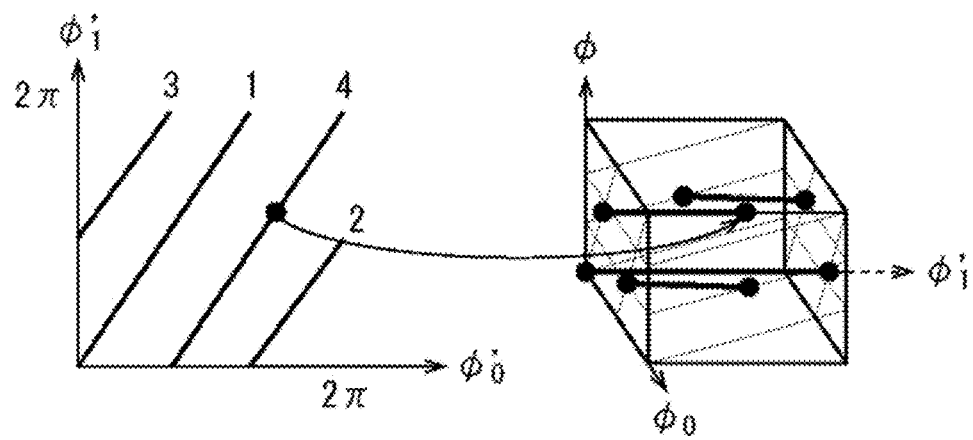

When the relationship between the phase $\phi'_0$ and the phase $\phi'_1$ is plotted on a two-dimensional phase plane, a group including a plurality of straight lines is indicated with a left graph in FIG. 6B. Furthermore, when triaxial expression including the phase $\phi$ added is made, straight lines are made on a three-dimensional space as illustrated on the right side in FIG. 6B. However, only one set of i and j satisfying the relationship, is present in a case where $N_0$ and $N_1$ are relatively prime. Therefore, the phase $\phi$ can be uniquely acquired with respect to the phase $\phi'_0$ and the phase $\phi'_1$ so that the phase unwrapping having no uncertainty can be achieved.

That is, a phase distribution 27-4 in the phase $\phi$ in the horizontal direction (FIG. 5D) can be acquired on the basis of the phase distribution 23-4-1 and the phase distribution 23-4-2 (FIG. 5C) in the example of FIGS. 5A, 5B, 5C, 5D, 5E, 5F, 5G and 5H. In addition, a phase distribution 28-4 in the phase $\phi$ in the vertical direction (FIG. 5H) can be acquired on the basis of the phase distribution 26-4-1 and the phase distribution 26-4-2 (FIG. 5G).

<Asynchronous Noise>Next, a possible error in the phase-shift method, will be described. First, asynchronous noise will be described. A projector device typified by digital light processing (DLP) (registered trademark) or the like, repeats blinking of RGB in considerably short cycles. In addition, in a camera device typified by a complementary metal oxide semiconductor (CMOS), a phenomenon referred to as a rolling shutter occurs so that the time during which exposure is performed, varies depending on a position in the vertical direction. The exposure timing between the projector and the camera is shifted due to the factors so that strip-shaped noise (asynchronous noise) is randomly generated in the captured image and thus there is a possibility that correct measurement in phase cannot be performed in the noise generating area (FIG. 7A).

The asynchronous noise can be inhibited from occurring, by synchronizing the projector and the camera. However, a special system configuration is required to synchronize the projector and the camera so that there is a risk of an increase in cost. Particularly, a projector system including a plurality of units each including a projector and a camera, combined, has difficulty in synchronizing a projector and a camera between different units.

Figure 7A:
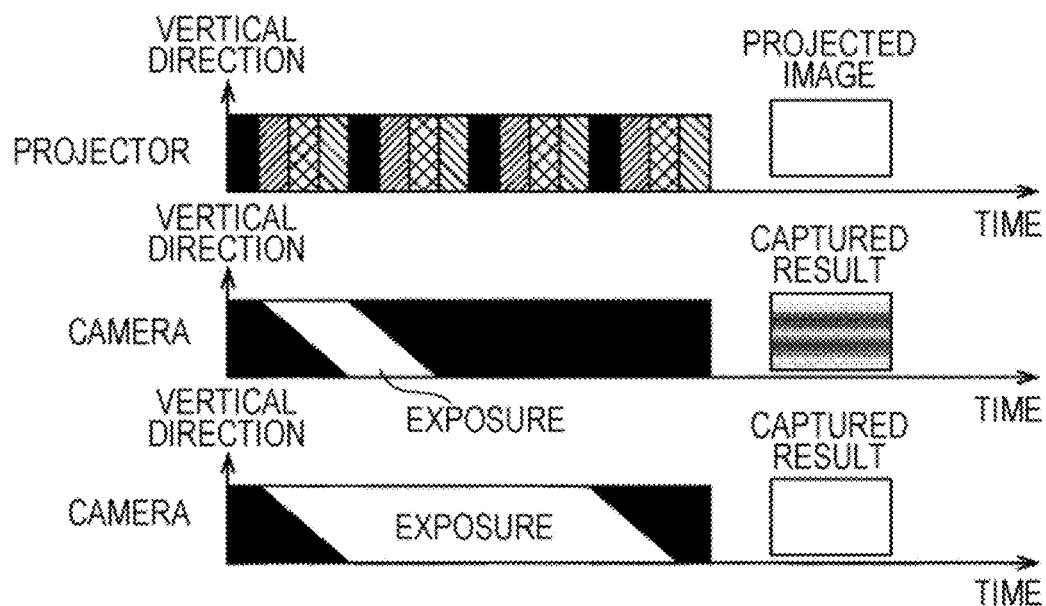
FIGS. 7A and 7B are diagrams for describing an error in corresponding- point detection.

There is a method of lengthening exposure time by lowering the sensitivity of the camera as a simple measure, as indicated at the lowermost stage in FIG. 7A. With this arrangement, the projected image of the projector is temporally averaged so that the noise can be inhibited from occurring. However, the exposure time of the camera lengthens for the method so that there is a possibility that measurement time increases. In some cases, there is a possibility that the corresponding-point detection cannot be completed during an allowable period in terms of implementation.

<Interreflection Phenomenon>

Next, an interreflection phenomenon will be described. In a case where a projected surface includes a plurality of planes/curved surfaces, there is a possibility that interreflection occurs between the planes/curved surfaces, differently from a typical screen. In an example in FIG. 7B, light emitted to a projected surface 51, is partially reflected from the projected surface 51 so that the reflected light is emitted to a projected surface 52.

Since reflected light generally diffuses, if the reflected light of a first projected surface sufficiently diffuses, a pattern projected onto the first projected surface is not transferred to a second projected surface even when the reflected light is emitted to the different second projected surface. Therefore, the pattern detected on the first projected surface, is not detected on the second projected surface so that no error occurs.

Figure 7B:
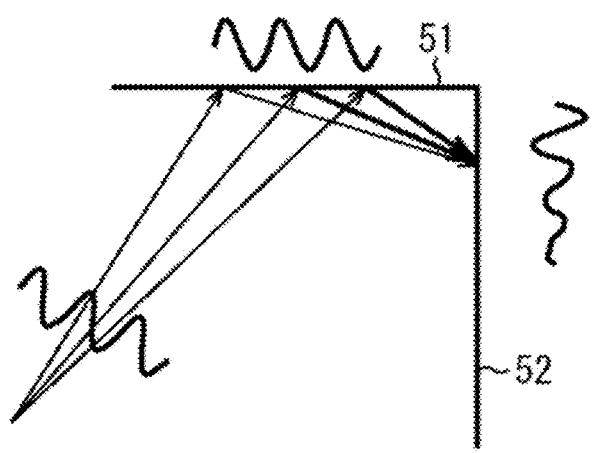

However, when the distance between the projected surface 51 and the projected surface 52 is short as illustrated in the example in FIG. 7B, the diffusion is insufficient so that there is a possibility that the pattern projected onto the projected surface 51 is transferred to the projected surface 52 and the pattern detected on the projected surface 51 is also detected on the projected surface 52. Particularly, the possibility of the transfer is high for a simple pattern used in the phase-shift method. When a pattern is transferred in this manner, the same pattern is generated at a plurality of positions so that there is a possibility of causing false detection and the occurrence of a measurement error.

A method of increasing the spatial frequency of a sinusoidal pattern projected from the projector, can be considered as a measure, but the projector and the camera each require a high-resolution device so that there is a possibility of an increase in cost. In addition, there is a possibility that a pattern having high frequency is blurred due to influence, such as scattering and absorption, depending on the material of the projected surface.

<2. First Embodiment>
<Periodic Phase Inversion of Sinusoidal Pattern>

Thus, in pattern projection control, a projecting unit may project a second pattern including a first pattern including repetition in first cycles in a first direction, inverted in phase in second cycles in a second direction orthogonal to the first direction, in order to acquire the corresponding relationship in pixel between the projecting unit and a capturing unit.

Note that the first pattern is arbitrary, but a pattern including, for example, a predetermined parameter sinusoidally varying, may be provided.

In addition, the parameter is arbitrary, and thus an arbitrary parameter, for example, relating to an image may be provided. For example, the parameter may be made to be luminance or may be made to be color, or a different parameter may be provided.

Figure 8A:
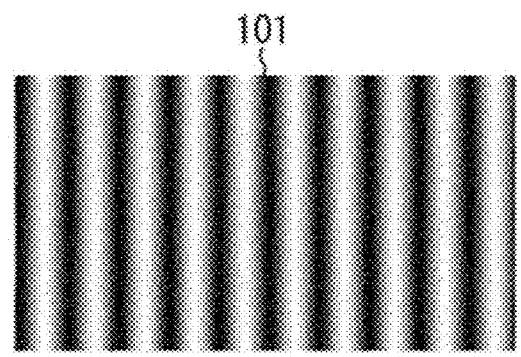
FIGS. 8A, 8B and 8C are diagrams for describing exemplary periodic phase inversion of a sinusoidal pattern.
Figure 8B:
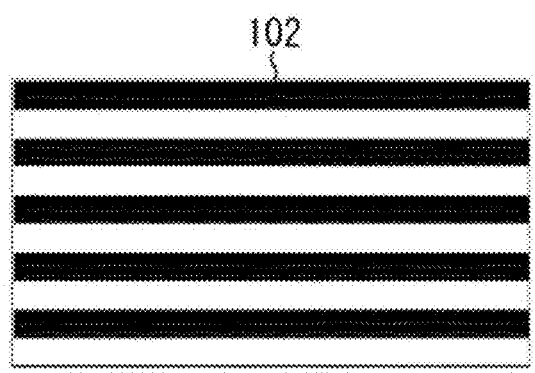
Figure 8C:
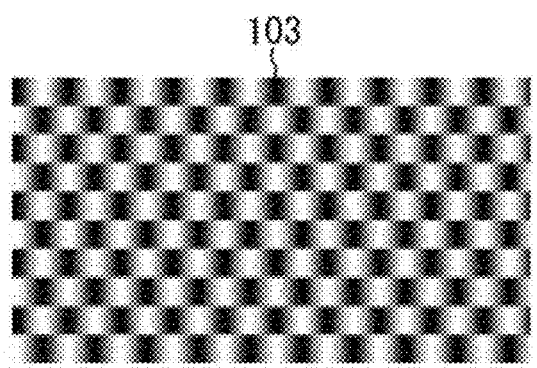

For example, the projecting unit projects, as an image, a projected pattern 103 (namely, the second pattern) as illustrated in FIG. 8C, the projected pattern 103 including a sinusoidal pattern (namely, the first pattern) 101 including a pattern (namely, the first pattern) repeated in predetermined cycles (namely, the first cycles) in the horizontal direction (namely, the first direction), inverted in phase in predetermined cycles (namely, the second cycles) in the vertical direction (namely, the second direction) with a phase inverted pattern 102 as illustrated in FIG. 8B, the pattern including a sinusoidal variation in luminance (namely, the parameter) in the horizontal direction as illustrated in FIG. 8A.

FIG. 8B illustrates the phase inverted pattern 102 as a striped pattern including a white region and a black region (binary) formed in the predetermined cycles (namely, the second cycles) in the vertical direction (namely, the second direction). For example, the white region indicates a region to be inverted in phase (a phase inverted region), and the black region indicates a region not to be inverted in phase (a phase non-inverted region). That is, the sinusoidal pattern 101 includes a portion to be inverted in phase, the portion being superimposed on the white region of the phase inverted pattern 102, in a state where the sinusoidal pattern 101 and the phase inverted pattern 102 have been superimposed as the same in size. The projected pattern 103 results from the sinusoidal pattern 101 inverted in phase in this manner. The cycle of the phase inverted pattern 102 (the second cycle) may be the same as or may be different from the cycle of the sinusoidal pattern 101 (the first cycle). Note that the phase inverted region and the phase non-inverted region of the phase inverted pattern 102 are indicated with the white and the black, respectively, in FIG. 8B, but the phase inverted pattern 102 may include any values of mutually identifiable binary since both of the regions are at least identified.

As illustrated in FIGS. 8A, 8B and 8C, the projected pattern 103 is narrower than the sinusoidal pattern 101 in pattern so that the reflected light from the projected surface diffuses easier in a case where the projected pattern 103 is projected, than in a case where the sinusoidal pattern 101 is projected. That is, the possibility of detecting the projected pattern 103 on a different projected surface to be irradiated with the reflected light, lowers (the projected pattern is inhibited from being transferred). Therefore, the false detection due to the interreflection phenomenon and the occurrence of the measurement error can be inhibited (corresponding-point detection accuracy can be inhibited from degrading).

In addition, in the corresponding-point detection, the corresponding point in pixel between the projected unit and the capturing unit, may be detected with a captured image acquired by capturing the projected image of the second pattern including the first pattern including the repetition in the first cycles in the first direction, inverted in phase in the second cycles in the second direction orthogonal to the first direction, by the capturing unit, the projected image being projected onto the projected surface by the projecting unit.

The variation of the parameter in the captured image of the projected image is acquired as a phase so that the corresponding-point detection may be performed on the basis of the phase.

In addition, the corresponding point may be detected by inversion in phase for the region inverted in phase in the second pattern.

For example, the corresponding point in pixel between the projecting unit and the capturing unit, is detected with the captured image including the projected image of the projected pattern 103 (namely, the second pattern) as illustrated in FIG. 8C captured, in a case where the projecting unit has projected the projected pattern 103 onto the projected surface, the projected pattern 103 including the sinusoidal pattern (namely, the first pattern) 101 including the pattern (namely, the first pattern) repeated in the predetermined cycles (namely, the first cycles) in the horizontal direction (namely, the first direction), inverted in phase in the predetermine cycles (namely, the second cycles) in the vertical direction (namely, the second direction) with the phase inverted pattern 102 illustrated in FIG. 8B, the pattern including the sinusoidal variation in luminance (namely, the parameter) in the horizontal direction as illustrated in FIG. 8A.

That is, the sinusoidal pattern 101 includes a portion to be inverted in phase, the portion being superimposed on the white region of the phase inverted pattern 102, in a state where the sinusoidal pattern 101 and the phase inverted pattern 102 have been superimposed as the same in size. The projected pattern 103 results from the sinusoidal pattern 101 inverted in phase in this manner, and the corresponding-point detection is performed with the captured image including the projected image of the projected pattern 103 captured.

Expression (7) described above is satisfied for the area not inverted in phase in the projected pattern 103. In contrast to this, the original phase ϕ' is added by the phase inversion in the area inverted in phase. Therefore, when a detected phase is defined to be ϕ", the relationship expressed by the following Expressions (8) to (10) is satisfied in the area.

[Mathematical Formula 8]

$$\phi_k'' = \phi_k' + \pi : k = 0, 1 \quad (8)$$

[Mathematical Formula 9]

$$\frac{(\phi_0'' + 2\pi j)}{N_0} = \frac{(\phi_1'' + 2\pi j)}{N_1} \quad (9)$$

[Mathematical Formula 10]

$$\phi = \frac{(\phi_0' + 2\pi j)}{N_0} \quad (10)$$

$i, j \in$ integer

Here, when the condition of Expression (11) is added to the parameters $N_0$ and $N_1$, the relationship in Expression (12) is satisfied.

[Mathematical Formula 11]

$$N_1 = N_0 + 1 \quad (11)$$

[Mathematical Formula 12]

$$\frac{(N_0 + 1)\phi_0'' - N_0\phi_1''}{\pi} = 2(i(N_0 + 1) - jN_0) + 1 \quad (12)$$

Even when it is unknown whether actually-observed phases $\phi'_{meas,\,0}$ and $\phi'_{meas,\,1}$ are each the phase inverted region, this indicates that it can be determined that the phases are each the phase non-inverted region if $((N_0+1)\phi'_{meas,\,0} - N_0{}_{,\,meas}\phi_1)/\pi$ is even and the phases are each the phase inverted region if $((N_0+1)\phi'_{meas,\,0} - N_0{}_{,\,meas}\phi'_1)/\pi$ is odd. Therefore, a phase inversion discriminant DetInverse can be defined by the following Expression (13).

[Mathematical Formula 13]

$$DetInverse(\phi'_{meas,0}, \phi'_{meas,1}) = \text{Mod}\left(\frac{(N_0+1)\phi'_{meas,0} - N_0\phi'_{meas,1}}{\pi}, 2\right) \quad (13)$$

Figure 9A:
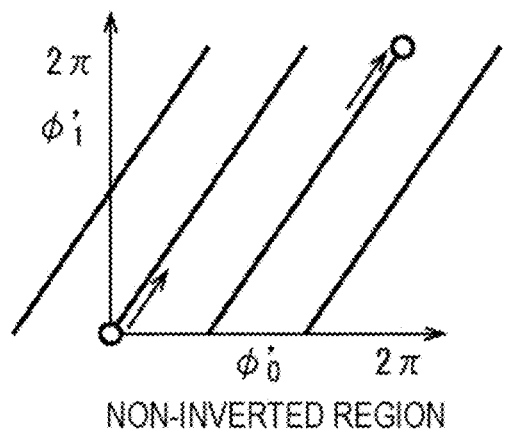
FIGS. 9A, 9B and 9C are diagrams for describing exemplary phase detection.
Figure 9B:
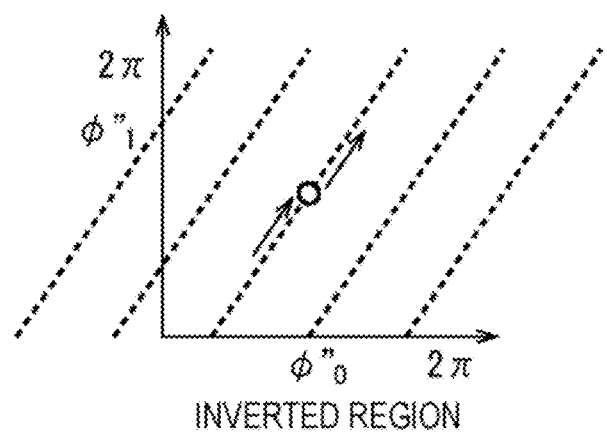
Figure 9C:
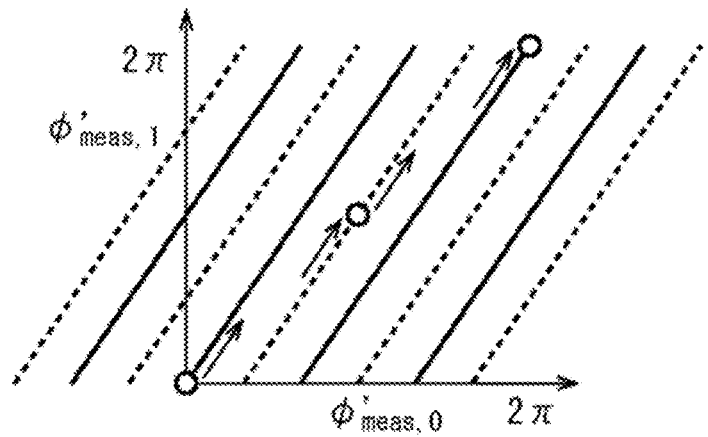

For example, when the following expression are satisfied: $N_0=2$ and $N_1=3$, the relationship between the phase $\phi'_0$ and the phase $\phi'_1$ is indicated with a graph in FIG. 9A in the phase non-inverted region including non-inversion in phase, and the relationship between the phase $\phi'_0$ and the phase $\phi'_1$ is indicated with a graph in FIG. 9B in the phase inverted region including inversion in phase. That is, the regions each have mutually a similar straight-line group except that an initial phase becomes (π, π). Therefore, as illustrated in a graph in FIG. 9C, the straight line groups observed in both regions do not intersect so that the phase inverted region and the phase non-inverted region can be identified from the observed values. That is, the phase unwrapping can be performed without region determination.

Figure 10A:
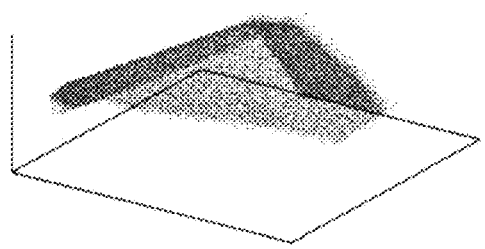
FIGS. 10A, 10B and 10C are diagrams for describing exemplary projected surface detected results.
Figure 10B:
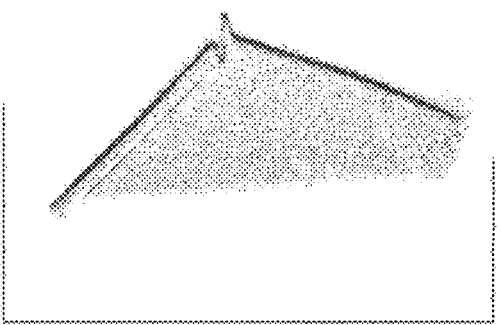
Figure 10C:
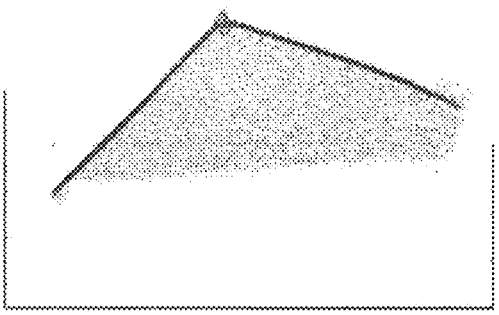

For example, when two planes (a dark portion in a graph) illustrated in FIG. 10A are defined as projected surfaces, projected surfaces are detected as illustrated in FIG. 10B in a case where the phase-shift method (or the multi-phase-shift method) is performed with the sinusoidal pattern 101 (FIG. 8A) projected. FIG. 10B is a plan view of the three-dimensional graph illustrated in FIG. 10A when viewed from the upper side. As illustrated in FIG. 10B, in this case, false detection, due to the interreflection, occurs in proximity to a joint of the two projected surfaces so that the projected surfaces cannot be correctly detected in shape. In contrast to this, the projected surfaces are detected as illustrated in FIG. 10C in a case where the phase-shift method (or the multi-phase-shift method) is performed with the projected pattern 103 (FIG. 8C) projected. FIG. 10C is a plan view of the three-dimensional graph illustrated in FIG. 10A when viewed from the upper side. As illustrated in FIG. 10C, in this case, the false detection, due to the interreflection, occurring in proximity to the joint of the two projected surfaces, is more inhibited than that in FIG. 10B so that the projected surfaces can be more accurately detected in shape. That is, the corresponding-point detection accuracy can be inhibited from degrading.

Note that the phase non-inverted region and the phase inverted region described above may be previously set. In addition, the phase non-inverted region and the phase inverted region may be set before the corresponding-point detection is performed. For example, in the pattern projection control, the projecting unit may project a third pattern including repetition in the second cycles in the second direction and a fourth pattern including the third pattern inverted in phase, before projecting the second pattern.

In other words, in the corresponding-point detection, the region to be inverted in phase in the second pattern, may be acquired with the captured image of the projected image of the third pattern including the repetition in the second cycles in the second direction and the captured image of the projected image of the fourth pattern including the third pattern inverted in phase, acquired by the capturing unit, the projected images being projected by the projecting unit before projecting the second pattern.

The third pattern and the fourth pattern may include the binary repeated in the second cycles in the second direction, the binary including mutually opposite phases.

Figure 11A:
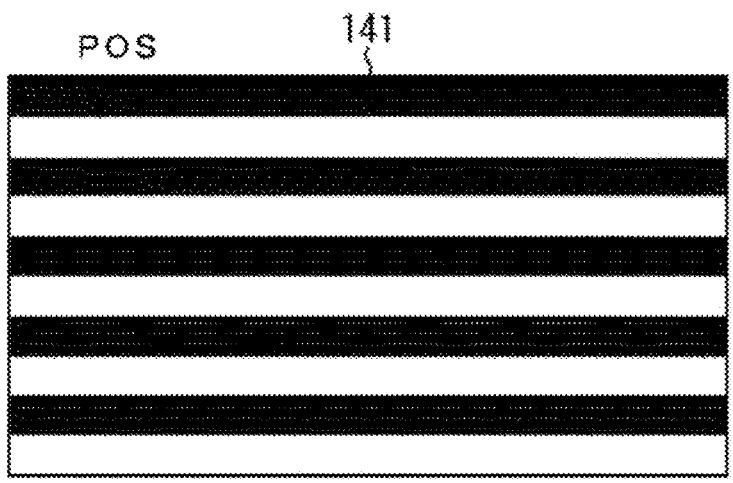
FIGS. 11A and 11B are diagrams for describing exemplary region setting patterns.
Figure 11B:
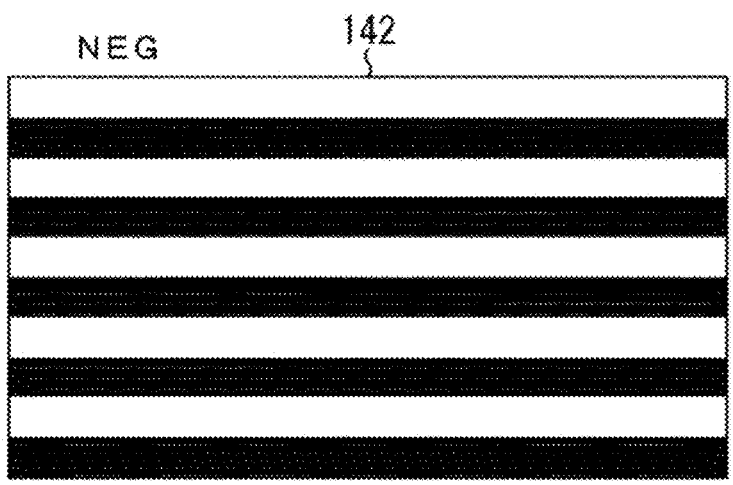

More specifically, for example, before the projected pattern 103 is projected, a region setting pattern 141 (namely, the third pattern) illustrated in FIG. 11A and a region setting pattern 142 (namely, the fourth pattern) illustrated in FIG. 11B are projected so that the phase non-inverted region and the phase inverted region may be set on the basis of the region setting patterns.

FIGS. 11A and 11B illustrate the region setting pattern 141 and the region setting pattern 142 each as a striped pattern including the white region and the black region (the binary) formed in the predetermined cycles (namely, the second cycles) in the vertical direction (namely, the second direction). Then, the binary included in the striped pattern between the region setting pattern 141 and the region setting pattern 142, has been inverted. That is, the white region and the black region are switched.

The projecting unit projects the two region setting patterns as images and then the capturing unit captures the respective projected image of the two region setting patterns so as to acquire the captured images. Then, the difference between the pixel value of the captured image of the projected image of the region setting pattern 141 and the pixel value of the captured image of the projected image of the region setting pattern 142, is calculated so that the phase non-inverted region and the phase inverted region are set by the following Expression (14) on the basis of the difference value.

[Mathematical Formula 14]

$$\text{if POS-NEG} > th : \text{Non-Inverted Region}$$

$$\text{Else if POS-NEG} < -th : \text{Inverted Region}$$

$$\text{Else:Ineffective Region} \quad (14)$$

As described above, the white region and the black region have been switched in position between the region setting pattern 141 and the region setting pattern 142. Thus, the difference occurring between the captured images of both of the patterns, includes a positive region and a negative region in terms of sign. The phase non-inverted region and the phase inverted region are identified on the basis of the difference value. Since an error occurs in practice, a predetermined threshold value th is used so that three regions are identified. That is, a region including the difference value larger than the predetermined threshold value th is set as the phase non-inverted region, a region including the difference value smaller than the predetermined threshold value-th is set as the phase inverted region, and a different region is set as an ineffective region.

With this arrangement, tolerance against noise can improve and the corresponding-point detection accuracy can be inhibited from degrading, in comparison to a case where a region is determined from an observed value as described above.

Note that the cycle of the striped pattern (the second cycle) may be the same as or may be different from the cycle of the sinusoidal pattern 101 (the first cycle), in the region setting pattern 141 and the region setting pattern 142. In addition, the striped pattern is not limited to the white and the black, and thus may include any parameters or values of mutually identifiable binary.

Note that, in the pattern projection control, the projecting unit may further project a fifth pattern including the first pattern including the repetition in the first cycles in the second direction, inverted in phase in the second cycles in the first direction.

In other words, in the corresponding-point detection, the corresponding point may be detected with a captured image acquired by capturing the projected image of the fifth pattern including the first pattern including the repetition in the first cycles in the second direction, inverted in phase in the second cycles in the first direction, by the capturing unit, the projected image being projected onto the projected surface by the projecting unit.

That is, only the phase detection in the horizontal direction has been described with reference to FIGS. 8A, 8B, 8C, 9A, 9B, 9C, 10A, 10B, 10C, 11A and 11B, but the corresponding-point detection can be performed for the phase detection in the vertical direction, in a similar manner. Note that, in this case, the repeating direction of each pattern varies.

For example, in the sinusoidal pattern 101, the repeating direction of the pattern including the sinusoidal variation in luminance (namely, the first pattern), is made to be the vertical direction (the second direction). In addition, in the phase inverted pattern 102, the direction of the stripes (the repeating direction of the binary) is made to be the horizontal direction (the first direction). Therefore, the projected pattern 103 includes a pattern including a sinusoidal pattern including a pattern repeated in predetermined cycles in the vertical direction, inverted in phase in predetermined cycles in the horizontal direction (namely, the fifth pattern), the pattern including the sinusoidal variation in luminance in the vertical direction.

In addition, for example, the repeating direction of the white region and the black region (the binary) is made to be the horizontal direction (namely, the first direction), in the region setting pattern 141 and the region setting pattern 142.

With this arrangement, the corresponding point can be detected in a plurality of directions (e.g., the horizontal direction and the vertical direction).

Note that the projecting unit may project a plurality of the second patterns including the first patterns mutually shifted in phase, in the pattern projection control. For example, the projecting unit may project a trio of the second patterns including the first patterns mutually shifted by 120° in phase.

In other words, in the corresponding-point detection, the corresponding point may be detected with captured images acquired by capturing the projected images of the plurality of the second patterns including the first patterns mutually shifted in phase, by the capturing unit, the projected images being projected onto the projected surface by the projecting unit. For example, the corresponding point may be detected with captured images acquired by capturing the projected images of the trio of the second patterns including the first patterns mutually shifted by 120° in phase, by the capturing unit, the projected images being projected onto the projected surface by the projecting unit.

That is, a plurality of projected patterns (e.g., three) is projected so that the corresponding point may be detected with the captured images of the projected images of the projected patterns, similarly to the examples of FIGS. 2A, 2B, 2C, 3A, 3B and 3C. With this arrangement, the corresponding point can be detected more accurately.

In addition, in the pattern projection control, the projecting unit may project the images of a plurality of the second patterns including the first cycles mutually different.

In other words, in the corresponding-point detection, the corresponding point may be detected with captured images acquired by capturing the projected images of the plurality of the second patterns including the first cycles mutually different, by the capturing unit, the projected images being projected onto the projected surface by the projecting unit.

That is, a plurality of projected pattern groups including cycles mutually different is projected so that the corresponding point may be detected with the captured images of the projected images of the projected patterns, similarly to the examples of FIGS. 5A, 5B, 5C, 5D, 5E, 5F, 5G, 5H, 6A and 6B. That is, the present technology described above can be also applied to the multi-phase-shift method. With this arrangement, the corresponding point can be detected more accurately.

<Rotation of Sinusoidal Pattern>

In addition, as a different method in the pattern projection control, the projecting unit may project a predetermined pattern including repetition in predetermined cycles in the first direction different from the direction in which the phase is detected, in order to acquire the corresponding relationship in pixel between the projecting unit and the capturing unit.

Note that the predetermined pattern is arbitrary, and thus a pattern including a predetermined parameter sinusoidally varying, may be provided, for example.

In addition, the parameter is arbitrary, and thus an arbitrary parameter, for example, relating to an image, may be provided. For example, the parameter may be made to be luminance or may be made to be color, or a different parameter may be provided.

Figure 12A:
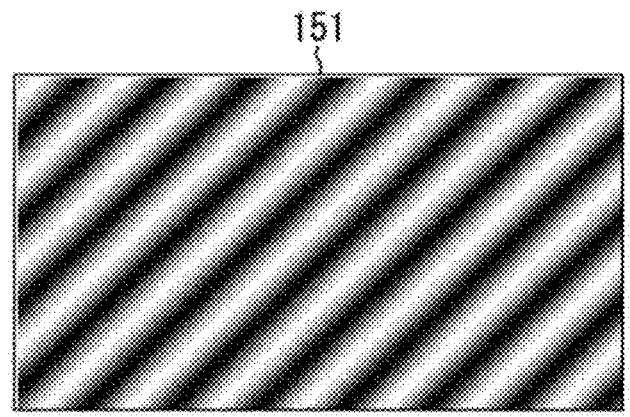
FIGS. 12A, 12B, 12C, 12D and 12E are diagrams for describing exemplary rotation of a sinusoidal pattern.

For example, in a case where the phase is detected in the vertical direction, the projecting unit projects, as an image, a projected pattern 151 including a pattern (namely, a predetermined pattern) repeated in predetermined cycles in a slant direction (namely, the first direction) different from the vertical direction, the pattern including a sinusoidal variation in luminance (namely, the parameter) as illustrated in FIG. 12A. The projected pattern 151 illustrated in FIG. 12A is, for example, a pattern (a rotated sinusoidal pattern) including a sinusoidal pattern including the repeating direction of the variation in luminance in the vertical direction, rotated, with the repeating direction being in the slant direction (the first direction), the sinusoidal pattern being similar to the sinusoidal patterns 24 illustrated in FIG. 3A.

Figure 12B:
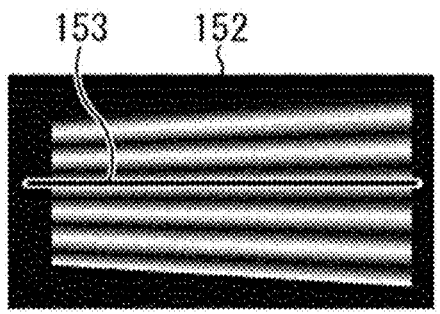

As illustrated in FIG. 12B, when the asynchronous noise is generated at a predetermined line in a captured image 152 of the projected image of the sinusoidal pattern including the repeating direction in the vertical direction similarly to the sinusoidal patterns 24 (when the entire predetermined line becomes an asynchronous-noise generating region 153), the luminance value of the line entirely includes an error.

For example, the sinusoidal pattern $I_{pj,k}(y_{pj})$ and the phase $\phi(y_{pj})$ on the line of the pixel $y_{pj}$ in the projecting unit, are expressed by the following Expressions (15) and (16), respectively. Note that N represents the number of sinusoidal waves and $y_{pj,\ max}$ represents the maximum pixel value of $y_{pj}$.

[Mathematical Formula 15]

$$I_{pj,k}(y_{pj}) = 0.5A\left(1 + \sin\left(N\phi(y_{pj}) + \frac{2\pi}{3}k\right)\right) \quad (15)$$

[Mathematical Formula 16]

$$\phi(y_{pj}) = 2\pi y_{pj}/y_{pj},\max \quad (16)$$

Figure 12C:
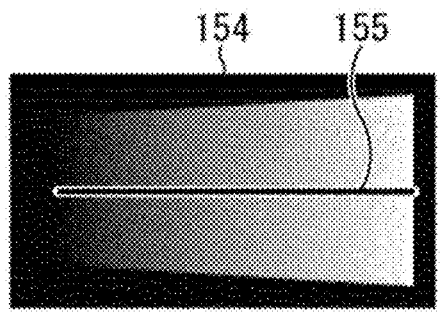

Therefore, a region corresponding to the entire line in a phase distribution 154 generated with the captured image 152 as illustrated in FIG. 12C, becomes an asynchronous-noise generating region 155. That is, in this case, there is a possibility that the phase cannot be correctly detected in a wide range.

Figure 12D:
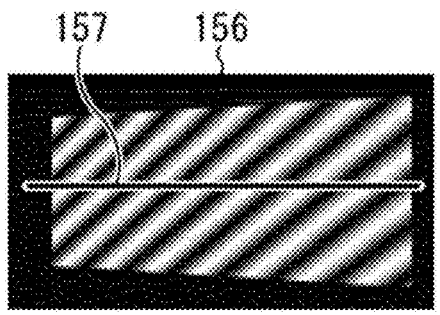

In contrast to this, when the asynchronous noise is generated at a predetermined line in a captured image 156 of the projected image of the projected pattern 151 as illustrated in FIG. 12D, the entire line becomes an asynchronous-noise generating region 157. However, the repeating direction of the variation in luminance of the projected pattern 151, is not vertical to the asynchronous-noise generating region 157.

Therefore, for the projected pattern 151, the sinusoidal pattern $I_{pj,\ k}(x_{pj}, y_{pj})$ and the phase $\phi(X_{pj}, y_{pj})$ of the pixel $(x_{pj}, y_{pj})$ in the projecting unit are expressed by the following Expressions (17) and (18).

[Mathematical Formula 17]

$$I_{pj,k}(x_{pj}, y_{pj}) = 0.5A\left(1 + \sin\left(N\phi(x_{pj}, y_{pj}) + \frac{2\pi}{3}k\right)\right) \quad (17)$$

[Mathematical Formula 18]

$$\phi(x_{pj}, y_{pj}) = 2\pi^*(x_{pj} + y_{pj})/(x_{pj},\max + y_{pj},\max) \quad (18)$$

Figure 12E:
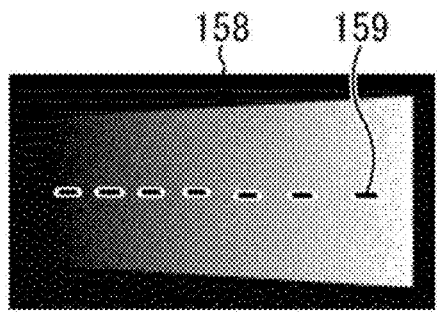

That is, the asynchronous-noise generating region 157 includes not only a region having high luminance but also a region having low luminance. A noise level decreases in the region having the low luminance so that an intermittent region is provided as an asynchronous-noise generating region 159 in a phase distribution 158 generated with the captured image 156 as illustrated in FIG. 12E.

That is, the asynchronous-noise generating region 159 decreases so that the influence of the asynchronous noise with respect to the phase distribution can be inhibited. Therefore, there is no need to lengthen the exposure time of the capturing unit, and the corresponding-point detection accuracy can be inhibited from degrading with no increase in measurement time and in cost.

Note that the repeating direction (namely, the first direction) in the rotated sinusoidal pattern including the repeating direction rotated, is arbitrary except the direction in which the phase is detected. For example, a direction slanting at an angle in a predetermined range with respect to the vertical direction in a captured image captured and acquired by the capturing unit, may be provided. In addition, for example, the range may be made from 40° to 50°. In addition, for example, a direction slanting by 45° from the vertical direction, may be provided.

In addition, in the corresponding-point detection, the corresponding point in pixel between the projecting unit and the capturing unit may be detected with a captured image acquired by capturing the projected image of a predetermined pattern including repetition in predetermined cycles in the first direction different from the direction in which the phase is detected, by the capturing unit, the projected image being projected onto the projected surface by the projecting unit.

The variation of the parameter in the captured image of the projected image is acquired as a phase so that the corresponding-point detection may be performed on the basis of the phase.

Note that, in the pattern projection control, the projecting unit may further project a predetermined pattern including repetition in predetermined cycles in the second direction orthogonal to the first direction.

In other words, in the corresponding-point detection, the corresponding point may be detected with a captured image acquired by capturing the projected image of the predetermined pattern including the repetition in the predetermined cycles in the second direction orthogonal to the first direction, by the capturing unit, the projected image being projected onto the projected surface by the projecting unit.

That is, only the phase detection in the first direction has been described with reference to FIGS. 12A, 12B, 12C, 12D and 12E, but the corresponding-point detection can be performed for the phase detection in the second direction orthogonal to the first direction, in a similar manner. The repeating direction of the projected pattern in this case, is orthogonal to the repeating direction of the projected pattern 151.

With this arrangement, the corresponding point can be detected in a plurality of directions.

Note that, in the pattern projection control, the projecting unit may project a plurality of predetermined patterns mutually shifted in phase. For example, three predetermined patterns mutually shifted by 120° in phase, may be projected.

In other words, in the corresponding-point detection, the corresponding point may be detected with captured images acquired by capturing the projected images of the plurality of predetermined patterns mutually shifted in phase, by the capturing unit, the projected images being projected onto the projected surface by the projecting unit. For example, the corresponding point may be detected with captured images acquired by capturing the captured images of the three predetermined patterns mutually shifted by 120° in phase, by the capturing unit, the projected images being projected onto the projected surface by the projecting unit.

That is, a plurality of projected patterns (e.g., three) is projected so that the corresponding-point detection may be performed with the captured images of the projected images of the projected patterns, similarly to the examples of FIGS. 2A, 2B, 2C, 3A, 3B and 3C. With this arrangement, the corresponding point can be detected more accurately.

In addition, in the pattern projection control, the projecting unit may project a plurality of predetermined patterns each having a mutually different repeating cycle.

In other words, in the corresponding-point detection, the corresponding point may detected with captured images acquired by capturing the projected images of the plurality of predetermined patterns each having the mutually different repeating cycle, by the capturing unit, the projected images being projected onto the projected surface by the projecting unit.

That is, a plurality of projected pattern groups each having a mutually different cycle is projected so that the corresponding-point detection may be performed with the captured images of the projected images of the projected patterns, similarly to the examples of FIGS. 5A, 5B, 5C, 5D, 5E, 5F, 5G, 5H, 6A and 6B. That is, the present technology described above can be also applied to the multi-phase-shift method. With this arrangement, the corresponding point can be detected more accurately.

Note that, for example, for the projected pattern 103 including the sinusoidal pattern periodically inverted in phase as illustrated in FIG. 8C, the asynchronous-noise generating region including a predetermined line, includes not only a region having high luminance but also a region having low luminance. Therefore, in a case where the corresponding point is detected by projecting the projected pattern 103, the asynchronous-noise generating region also becomes intermittent in the phase distribution so as to be small. Therefore, the influence of the asynchronous noise with respect to the phase distribution can be also inhibited in this case. Therefore, there is no need to lengthen the exposure time of the capturing unit, and the corresponding-point detection accuracy can be inhibited from degrading with no increase in measurement time and in cost.

<Periodic Phase Inversion and Rotation of Sinusoidal Pattern>

As a further different method, the method of inverting a sinusoidal pattern periodically in phase and the method of rotating a sinusoidal pattern described above, may be combined and used.

That is, in the pattern projection control, the projecting unit may project the second pattern including the first pattern inverted in phase in the second cycles in the second direction orthogonal to the first direction, the first pattern including the repetition in the first cycles in the first direction different from the direction in which the phase is detected, in order to acquire the corresponding relationship in pixel between the projecting unit and the capturing unit.

In other words, in the corresponding-point detection, the corresponding point in pixel between the projecting unit and the capturing unit may be detected with a captured image acquired by capturing the projected image of the second pattern by the capturing unit, the second pattern including the first pattern inverted in phase in the second cycles in the second direction orthogonal to the first direction, the first pattern including the repetition in the first cycles in the first direction different from the direction in which the phase is detected, the projected image being projected onto the projected surface by the projecting unit.

Note that the predetermined patterns are arbitrary, and thus patterns each including a predetermined parameter sinusoidally varying, may be provided, for example.

In addition, the parameter is arbitrary, and thus an arbitrary parameter, for example, relating to an image may be provided. For example, the parameter may be made to be luminance or may be made to be color, or a different parameter may be provided.

Note that the repeating direction (namely, the first direction) in the rotated sinusoidal pattern including the repeating direction rotated, is arbitrary except the direction in which the phase is detected. For example, a direction slanting at an angle in a predetermined range with respect to the vertical direction in a captured image captured and acquired by the capturing unit, may be provided. In addition, for example, the range may be made from 40° to 50°. In addition, for example, a direction slanting by 45° from the vertical direction, may be provided.

In addition, the variation of the parameter in the captured image of the projected image is acquired as a phase so that the corresponding-point detection may be performed on the basis of the phase.

In addition, the corresponding point may be detected by inversion in phase for the region inverted in phase in the second pattern.

Figure 13A:
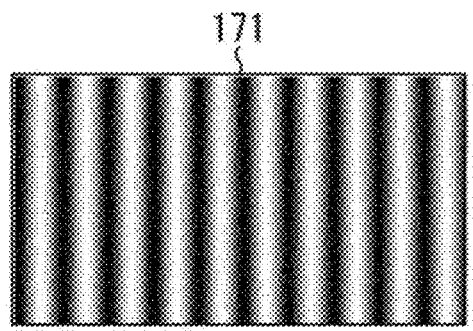
FIGS. 13A, 13B, 13C and 13D are diagrams for describing an exemplary combination of the periodic phase inversion and the rotation of a sinusoidal pattern.
Figure 13B:
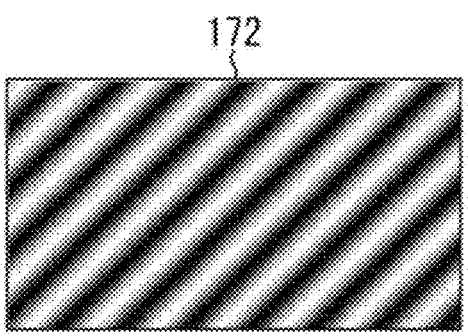
Figure 13C:
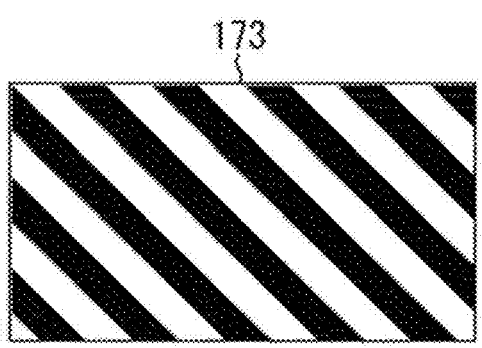

For example, the projecting unit projects, as an image, a projected pattern 174 (namely, the second pattern) (FIG. 13D) including a rotated sinusoidal pattern 172 (FIG. 13B) inverted in phase in predetermined cycles (namely, the second cycles, for example, D) in a repeating direction (namely, the second direction) with a phase inverted pattern 173 (FIG. 13C) having a repeating direction orthogonal to the repeating direction of the rotated sinusoidal pattern 172, the rotated sinusoidal pattern 172 including a sinusoidal pattern 171 (FIG. 13A) rotated by 45°, the sinusoidal pattern 171 including the repeating direction of a variation in luminance in the horizontal direction.

The phase inverted pattern 173 is similar to the phase inverted pattern 102 in FIG. 8B. That is, a striped pattern including the white region and the black region (the binary) formed in the second cycles in the second direction, is illustrated. For example, the white region indicates the phase inverted region and the black region indicates the phase non-inverted region. That is, the rotated sinusoidal pattern 172 includes a portion inverted in phase, the portion being superimposed on the white region of the phase inverted pattern 173, in a state where the rotated sinusoidal pattern 172 and the phase inverted pattern 173 have been superimposed as the same in size. The projected pattern 174 results from the rotated sinusoidal pattern 172 inverted in phase in this manner. The cycle of the phase inverted pattern 173 (the second cycle) may be the same as or may be different from the cycle of the sinusoidal pattern 171 (the first cycle) (namely, the rotated sinusoidal pattern 172). Note that the phase inverted region and the phase non-inverted region of the phase inverted pattern 173 are indicated with the white and the black, respectively, in FIG. 13C, but the phase inverted pattern 173 may include any values of mutually identifiable binary since both of the regions are at least identified.

In this case, when the repeating cycle of the phase inverted pattern 173 (the second cycle) is defined to be 2D (namely, the length of one phase inverted region or one phase non-inverted region in the projected pattern 174, in the repeating direction of the phase inverted pattern 173, is defined to be D), the sinusoidal pattern $I_{pj,k}(x_{pj}, y_{pj})$ and the phase $\phi(x_{pj}, y_{pj})$ of the pixel $(x_{pj}, y_{pj})$ in the projecting unit, are expressed by the following Expressions (19) and (20).

[Mathematical Formula 19]

$$I_{pj,k}(x_{pj}, y_{pj}) = 0.5A\left(1 + \sin\left(N\phi(x_{pj}, y_{pj}) + \frac{2\pi}{3}k\right)\right) \quad (19)$$

[Mathematical Formula 20]

$$\phi(x_{pj}, y_{pj}) = \begin{cases} \frac{2\pi(x_{pj} + y_{pj})}{(x_{pj,\max} + y_{pj,\max})} & : 2k\sqrt{2}D < |x_{pj} - y_{pj}| < (2k+1)\sqrt{2}D \\ \frac{2\pi(x_{pj} + y_{pj})}{(x_{pj,\max} + y_{pj,\max})} + \pi & : (2k+1)\sqrt{2}D < |x_{pj} - y_{pj}| < (2k+2)\sqrt{2}D \end{cases} \quad (20)$$

Figure 13D:
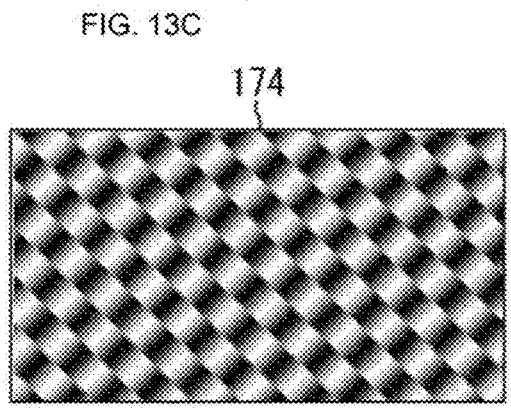

With this arrangement, the projected pattern 174 is narrower than the sinusoidal pattern 171 in the pattern as illustrated in FIG. 13D (the pattern is modulated on the side of higher frequency in a two-dimensional frequency space) so that the projected pattern can be inhibited from being transferred due to the interreflection phenomenon. Therefore, the false detection due to the interreflection phenomenon and the occurrence of the measurement error can be inhibited (the corresponding-point detection accuracy can be inhibited from degrading).

In addition, for the projected pattern 174, a region having high luminance and a region having low luminance both are included on each line, similarly to the projected pattern 103. That is, the asynchronous-noise generating region including a predetermined line, includes not only the region having the high luminance but also the region having the low luminance. Therefore, in this case, the asynchronous-noise generating region also becomes intermittent in the phase distribution so as to be small. Therefore, the influence of the asynchronous noise with respect to the phase distribution can be also inhibited in this case. Therefore, there is no need to lengthen the exposure time of the capturing unit, and the corresponding-point detection accuracy can be inhibited from degrading with no increase in measurement time and in cost.

Particularly, for the projected pattern 174, the repeating direction is made in a slant direction (not in the horizontal direction and in the vertical direction) so that a pattern in the line direction varies for each line (the length of the region having the high luminance and the length of the region having the low luminance) and thus a more intricate configuration is provided. Therefore, the asynchronous noise is more inconspicuous in the projected pattern 174 than in the projected pattern 103. Therefore, the influence of the asynchronous noise with respect to the phase distribution can be further inhibited.

Note that the phase inverted region and the phase non-inverted region may be identified from observed values in phase in the corresponding-point detection, or the phase non-inverted region and the phase inverted region may be previously set. In addition, the phase non-inverted region and the phase inverted region may be set before the corresponding-point detection is performed. For example, in the pattern projection control, the projecting unit may project the third pattern including the repetition in the second cycles in the second direction and the fourth pattern including the third pattern inverted in phase, before projecting the second pattern.

In other words, in the corresponding-point detection, the region to be inverted in phase in the second pattern, may be acquired with the captured image of the projected image of the third pattern including the repetition in the second cycles in the second direction and the captured image of the projected image of the fourth pattern including the third pattern inverted in phase, the captured images being acquired by the capturing unit, the projected images being projected by the projecting unit before projecting the second pattern.

The third pattern and the fourth pattern may include the binary repeated in the second cycles in the second direction, the binary including mutually opposite phases.

Figure 14A:
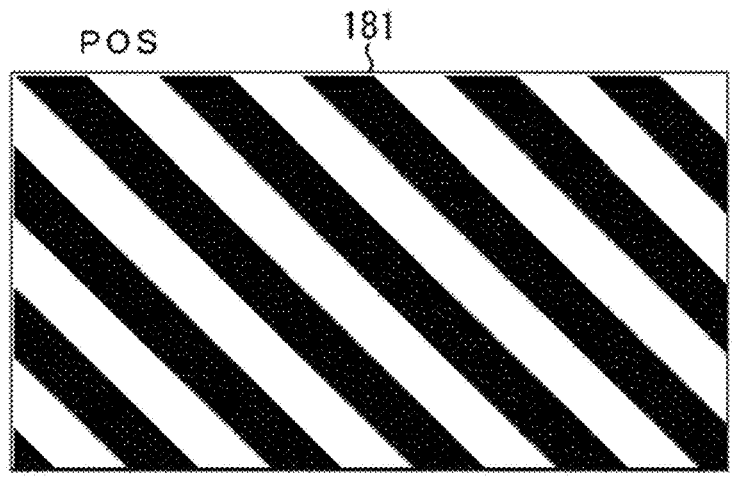
FIGS. 14A and 14B are diagrams for describing exemplary region setting patterns.
Figure 14B:
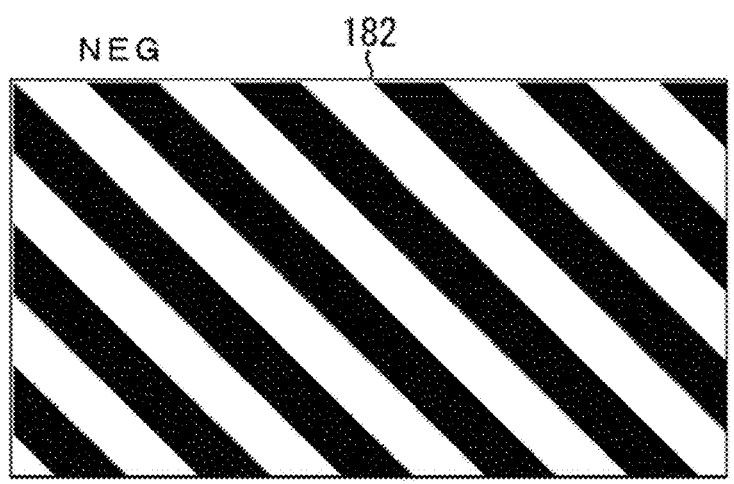

More specifically, for example, before the projected pattern 174 (FIG. 13D) is projected, a region setting pattern 181 (namely, the third pattern) as illustrated in FIG. 14A and a region setting pattern 182 (namely, the fourth pattern) as illustrated in FIG. 14B are projected so that the phase non-inverted region and the phase inverted region may be set on the basis of the region setting patterns.

The region setting pattern 181 and the region setting pattern 182 are each illustrated as a striped pattern including the white region and the black region (the binary) formed in the second cycles in the second direction. Then, the binary included in the striped pattern between the region setting pattern 181 and the region setting pattern 182, has been inverted. That is, the white region and the black region are switched.

When the repeating cycle of the patterns (the second cycle) is defined to be 2D, the pixel value $I_{pj,pos}(x_{pj}, y_{pj})$ of the region setting pattern 181 in each pixel $(x_{pj}, y_{pj})$ in the projecting unit, is expressed, for example, by the following Expression (21).

[Mathematical Formula 21]

$$I_{pj,pos}(x_{pj}, y_{pj}) = \begin{cases} \text{white}: & 2k\sqrt{2}D < |x_{pj} - y_{pj}| < (2k+1)\sqrt{2}D \\ \text{black}: & (2k+1)\sqrt{2}D < |x_{pj} - y_{pj}| < (2k+2)\sqrt{2}D \end{cases} \quad (21)$$

The difference in pixel between the captured images ($I_{cam,pos}$) and ($I_{cam,neg}$) of the projected images of the region setting pattern 181 ($I_{pj,pos}$) and the region setting pattern 182 ($I_{pj,neg}$), is calculated so as to be compared with the predetermined threshold value th (or -th) by the following Expression (22) so that three-state regions including the phase inverted region (true), the phase non-inverted region (false), and the ineffective (uncertain) region (undef) can be identified.

[Mathematical Formula 22]

$$inv(x_{cam}, y_{cam}) = \begin{cases} \text{false}: I_{cam,pos}(x_{cam}, y_{cam}) - I_{cam,neg}(x_{cam}, y_{cam}) > th \\ \text{true}: I_{cam,pos}(x_{cam}, y_{cam}) - I_{cam,neg}(x_{cam}, y_{cam}) < -th \\ undef: \text{else} \end{cases} \quad (22)$$

The phase φ' can be acquired by the following Expressions (23) to (25) with the result.

[Mathematical Formula 23]

$$E = (2I_{cam,0}(x_{cam}, y_{cam}) - I_{cam,1}(x_{cam}, y_{cam}) - I_{cam,2}(x_{cam}, y_{cam}))/3 \quad (23)$$

[Mathematical Formula 24]

$$F = (-I_{cam,1}(x_{cam}, y_{cam}) + I_{cam,2}(x_{cam}, y_{cam}))/\sqrt{3} \quad (24)$$

[Mathematical Formula 25]

$$\phi'(x_{cam}, y_{cam}) = \begin{cases} a\tan2(E, F): inv(x_{cam}, y_{cam}) = \text{true} \\ a\tan2(E, F) + \pi: inv(x_{cam}, y_{cam}) = \text{false} \\ \text{invalid}: inv(x_{cam}, y_{cam}) = undef \end{cases} \quad (25)$$

With this arrangement, the tolerance against noise can improve and the corresponding-point detection accuracy can be inhibited from degrading, in comparison to a case where a region is determined from an observed value as described above.

Note that in the region setting pattern 181 and the region setting pattern 182, the cycle of the striped pattern (the second cycle) may be the same as or may be different from the cycle of the sinusoidal pattern 101 (the first cycle). In addition, the striped pattern is not limited to the white and the black, and thus may include any parameters or values of mutually identifiable binary.

Note that, in the pattern projection control, the projecting unit may further project the fifth pattern including the first pattern including the repetition in the first cycles in the second direction, inverted in phase in the second cycles in the first direction. In other words, in the corresponding-point detection, the corresponding point may be detected with a captured image acquired by capturing the projected image of the fifth pattern including the first pattern including the repetition in the first cycles in the second direction, inverted in phase in the second cycles in the first direction, by the capturing unit, the projected image being projected onto the projected surface by the projecting unit. With this arrangement, the corresponding point can be detected in a plurality of directions.

Note that the projecting unit may project a plurality of the second patterns including the first patterns mutually shifted in phase, in the pattern projection control. For example, the projecting unit may project a trio of the second patterns including the first patterns mutually shifted by 120° in phase. In other words, in the corresponding-point detection, the corresponding point may be detected with captured images acquired by capturing the projected images of the plurality of the second patterns including the first patterns mutually shifted in phase, by the capturing unit, the projected images being projected onto the projected surface by the projecting unit. For example, the corresponding point may be detected with captured images acquired by capturing the projected images of the trio of the second patterns including the first patterns mutually shifted by 120° in phase, by the capturing unit, the projected images being projected onto the projected surface by the projecting unit.

That is, a plurality of projected patterns (e.g., three) is projected so that the corresponding point may be detected with the captured images of the projectedimages of the projected patterns, similarly to the examples of FIGS. 2A, 2B, 2C, 3A, 3B and 3C. With this arrangement, the corresponding point can be detected more accurately.

In addition, in the pattern projection control, the projecting unit may project the images of a plurality of the second patterns including the first cycles mutually different. In other words, in the corresponding-point detection, the corresponding point may be detected with captured images acquired by capturing the projected images of the plurality of the second patterns including the first cycles mutually different, by the capturing unit, the projected images being projected onto the projected surface by the projecting unit.

That is, a plurality of projected pattern groups including cycles mutually different is projected so that the corresponding point may be detected with the captured images of the projected images of the projected patterns, similarly to the examples of FIGS. 5A, 5B, 5C, 5D, 5E, 5F, 5G, 5H, 6A and 6B. That is, the present technology described above can be also applied to the multi-phase-shift method. With this arrangement, the corresponding point can be detected more accurately.

<3. Second Embodiment>
<Image Projecting and Capturing Device>

Figure 15:
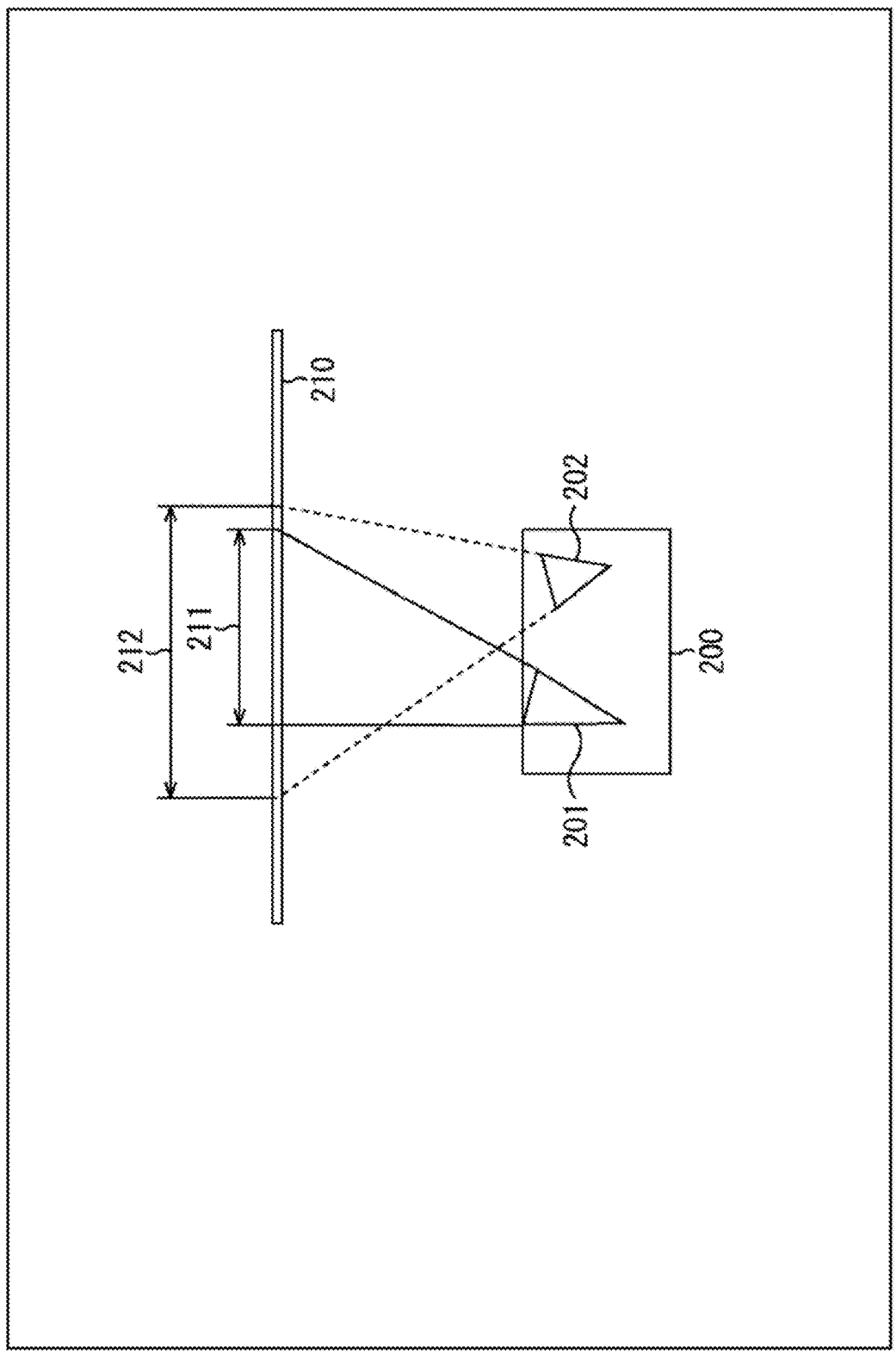
FIG. 15 is a diagram of an exemplary image projecting and capturing device.

Next, a configuration of achieving the various methods described in the first embodiment, will be described. FIG. 15 illustrates an exemplary main configuration of an image projecting and capturing device according to one embodiment of an information processing device to which the present technology has been applied.

The image projecting and capturing device 200 illustrated in FIG. 15, includes a projecting unit 201, and projects an image onto a projected surface 210 with the projecting unit 201. The projecting unit 201 performs processing relating to the projection of the image. For example, the projecting unit 201 emits projecting light so as to project an image of image data that has been supplied, to the outside of the image projecting and capturing device 200 (e.g., the projected surface 210). That is, the projecting unit 201 achieves a projecting function. The light source of the projecting unit 201 is arbitrary, and thus may be a light emitting diode (LED), a xenon lamp, or the like. In addition, the projecting unit 201 may emit a laser beam as the projecting light. Note that the projecting unit 201 may include, for example, an optical system including a plurality of lenses, diaphragms, and the like, the optical system configured to control the focal length, the exposure, the projecting direction, the projecting angle view, and the like, of the projecting light.

Note that a pixel of the projecting unit 201 corresponds to a pixel of the image projected by the projecting unit 201. For example, in a case where the light source is a laser beam, a unit of scanning control of the laser beam may correspond to the pixel of the projecting unit 201.

In addition, the image projecting and capturing device 200 further includes a capturing unit 202 and captures the projected surface 210 so as to acquire a captured image. The capturing unit 202 includes an image sensor, and photoelectrically converts incident light with the image sensor so as to capture a subject outside the device and to generate a captured image. That is, the capturing unit 202 achieves a capturing function (a sensor function). Note that the image sensor included in the capturing unit 202 is arbitrary, and thus may be, for example, a CMOS image sensor using a complementary metal oxide semiconductor (CMOS), a CCD image sensor using a charge coupled device (CCD), or a different sensor.

Note that a pixel of the capturing unit 202 corresponds to a pixel of the captured image acquired by the capturing unit 202. For example, a unit pixel of the image sensor included in the capturing unit 202 may correspond to the pixel of the capturing unit 202.

As illustrated in FIG. 15, a capturing range 212 of the capturing unit 202 on the projected surface 210, involves a projecting range 211 of the projecting unit 201 on the projected surface 210. Therefore, the captured image acquired by the capturing unit 202 includes a projected image projected onto the projected surface 210 by the projecting unit 201. The image projecting and capturing device 200 performs geometric correction or the like to the image projected by the projecting unit 201 with the captured image (namely, with reference to the state of the projection onto the projected surface 210) so that the distortion of the projected image on the projected surface 210 can be reduced.

The image projected by the image projecting and capturing device 200, may be a moving image or a still image. In addition, the captured image captured and acquired by the image projecting and capturing device 200, may be a moving image or a still image. In addition, the image projecting and capturing device 200 includes a speaker or the like provided so that the image projecting and capturing device 200 may be capable of outputting a sound. For example, the image projecting and capturing device 200 may be capable of outputting a sound corresponding to an image to be projected (e.g., back ground music (BGM) or the like), or may be capable of outputting a sound for operation check (e.g., a beep or a message).

The projected surface 210 is a surface on which the image projecting and capturing device 200 projects an image. The projected surface 210 may be a plane, a curved surface, a surface including unevenness partially or entirely, or may include a plurality of surfaces. In addition, the color of the projected surface 210 is arbitrary, and thus may include a plurality of colors.

The projected surface 210 may be formed on an arbitrary object. For example, the projected surface 210 may be formed on a planar object, such as a so-called screen or a wall surface. In addition, the projected surface 210 may be formed on a solid structure. For example, the formation may be made on a wall surface of a structure, such as a building, a station building, or a castle, may be made on a natural object, such as a rock, an artifact, such as a sign board or a bronze statue, or furniture, such as a drawer, a chair, or a desk, or may be made on a creature, such as a person or flora and fauna. In addition, for example, the projected surface 210 may be formed on a plurality of surfaces, such as a wall, a floor, and a ceiling in a room space.

In addition, the projected surface 210 may be formed on a solid or may be formed on liquid or gas. For example, the formation may be made on an aqueous surface, such as a pond or a pool, a current water surface, such as a waterfall or a fountain, or gas, such as fog or a gas. In addition, the projected surface 210 may be moved, deformed, or changed in color. In addition, for example, the projected surface 210 may be formed on a plurality of objects, such as a wall of a room, furniture, and a person, a plurality of buildings, or a castle wall and a fountain.

<Configuration of Image Projecting and Capturing Device>

Figure 16:
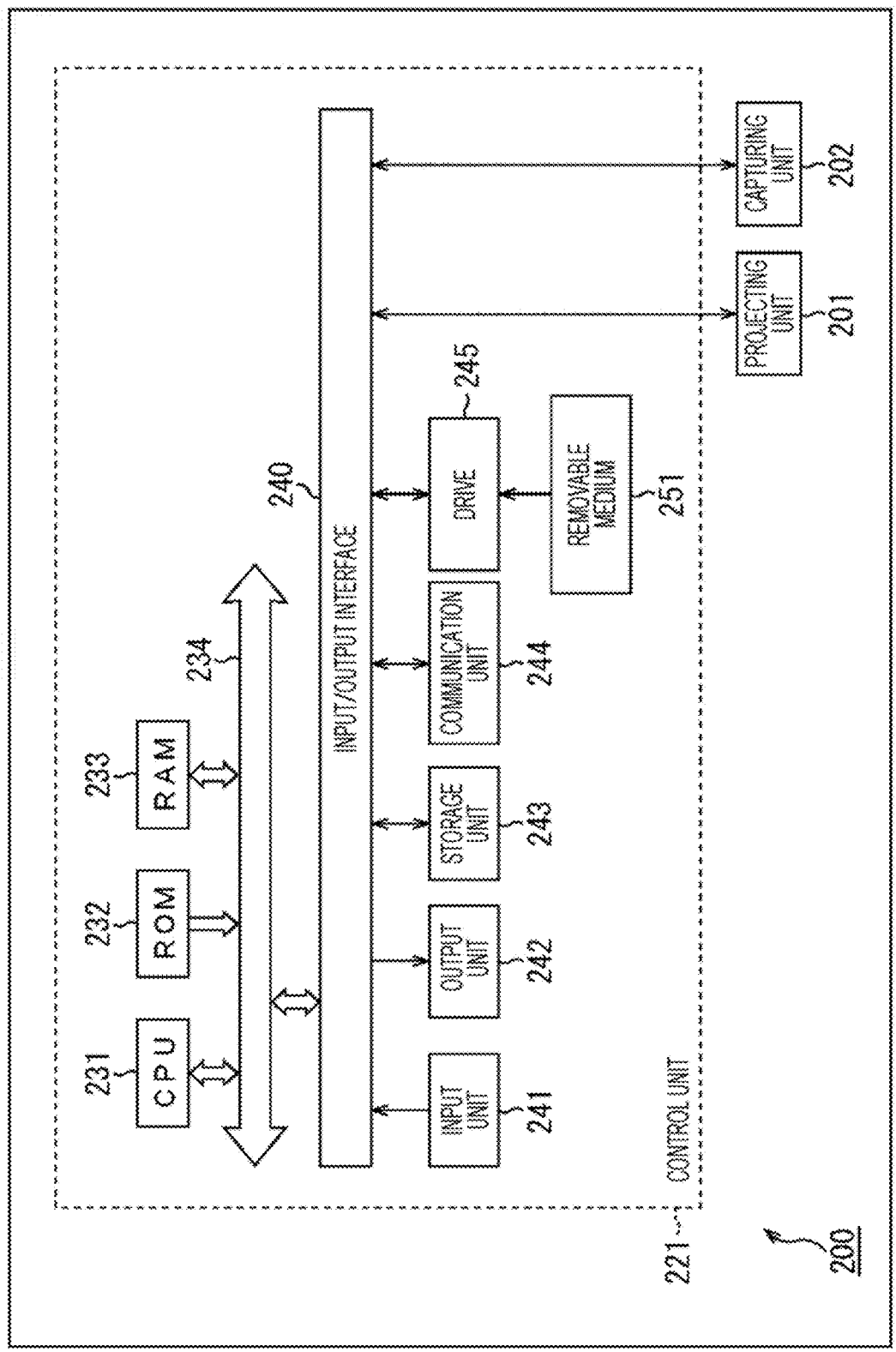
FIG. 16 is a block diagram of an exemplary main configuration of the image projecting and capturing device.

FIG. 16 is a block diagram of the exemplary main configuration of the image projecting and capturing device 200. As illustrated in FIG. 16, in addition to the projecting unit 201 and the capturing unit 202, the image projecting and capturing device 200 includes a control unit 221 that controls the units.

The control unit 221 controls the projecting unit 201 to perform projection. In addition, the control unit 221 controls the capturing unit 202 to perform capture. Furthermore, the control unit 221 performs processing of acquiring the corresponding relationship in pixel between the projecting unit 201 and the capturing unit 202 (processing of acquiring the corresponding point).

As illustrated in FIG. 16, the control unit 221 includes a central processing unit (CPU) 231, a read only memory (ROM) 232, a random access memory (RAM) 233, a bus 234, an input/output interface 240, an input unit 241, an output unit 242, a storage unit 243, a communication unit 244, and a drive 245.

The CPU 231, the ROM 232, and the RAM 233 are mutually coupled through the bus 234. The input/output interface 240 is also coupled to the bus 234. In addition to the projecting unit 201 and the capturing unit 202, for example, the input unit 241, the output unit 242, the storage unit 243, the communication unit 244, and the drive 245 are coupled to the input/output interface 240.

The input unit 241 includes an input device that receives external information, such as user input. Examples of the input unit 241 include a keyboard, a mouse, an operation button, a touch panel, a camera, a microphone, an input terminal, and the like. In addition, the input unit 241 may include various sensors, such as an acceleration sensor, an optical sensor, and a temperature sensor, and an input instrument, such as a bar-code reader. The output unit 242 includes an output device that outputs information on an image, a sound, and the like. Examples of the output unit 242 include a display, a speaker, an output terminal, and the like.

The storage unit 243 includes a storage medium that stores information on a program, data, or the like. Examples of the storage unit 243 include a hard disk, a RAM disk, a non-volatile memory, and the like. The communication unit 244 includes a communication device that communicates with an external device to transmit and receive information on a program, data, or the like through a predetermined communication medium. The communication unit 244 includes, for example, a network interface. For example, the communication unit 244 communicates with the external device of the image projecting and capturing device 200 (transmittance and reception of the program and the data).

For example, the drive 245 reads information (a program, data, or the like) stored in a removable medium 251, such as a magnetic disk, an optical disc, a magneto-optical disc, or a semiconductor memory, the removable medium 251 being mounted on the drive 245. The drive 245 supplies the information read from the removable medium 251, to the CPU 231, the RAM 233, or the like. In addition, the drive 245 can store information (a program, data, or the like) supplied from the CPU 231, the RAM 233, or the like, into the removable medium 251 in a case where the writable removable medium 251 has been mounted on the drive 245.

For example, the CPU 201 loads a program stored in the storage unit 243 onto the RAM 233 and executes the program through the input/output interface 240 and the bus 234, so as to perform various types of processing. In addition, the RAM 233 appropriately stores data necessary for the CPU 231 to perform the various types of processing.

For example, the CPU 201 can control the projecting unit 201 and the capturing unit 202 and perform processing relating to the corresponding-point detection, with the execution of the program or the like in that manner.

<Exemplary Configuration of Projecting Unit>

Figure 17:
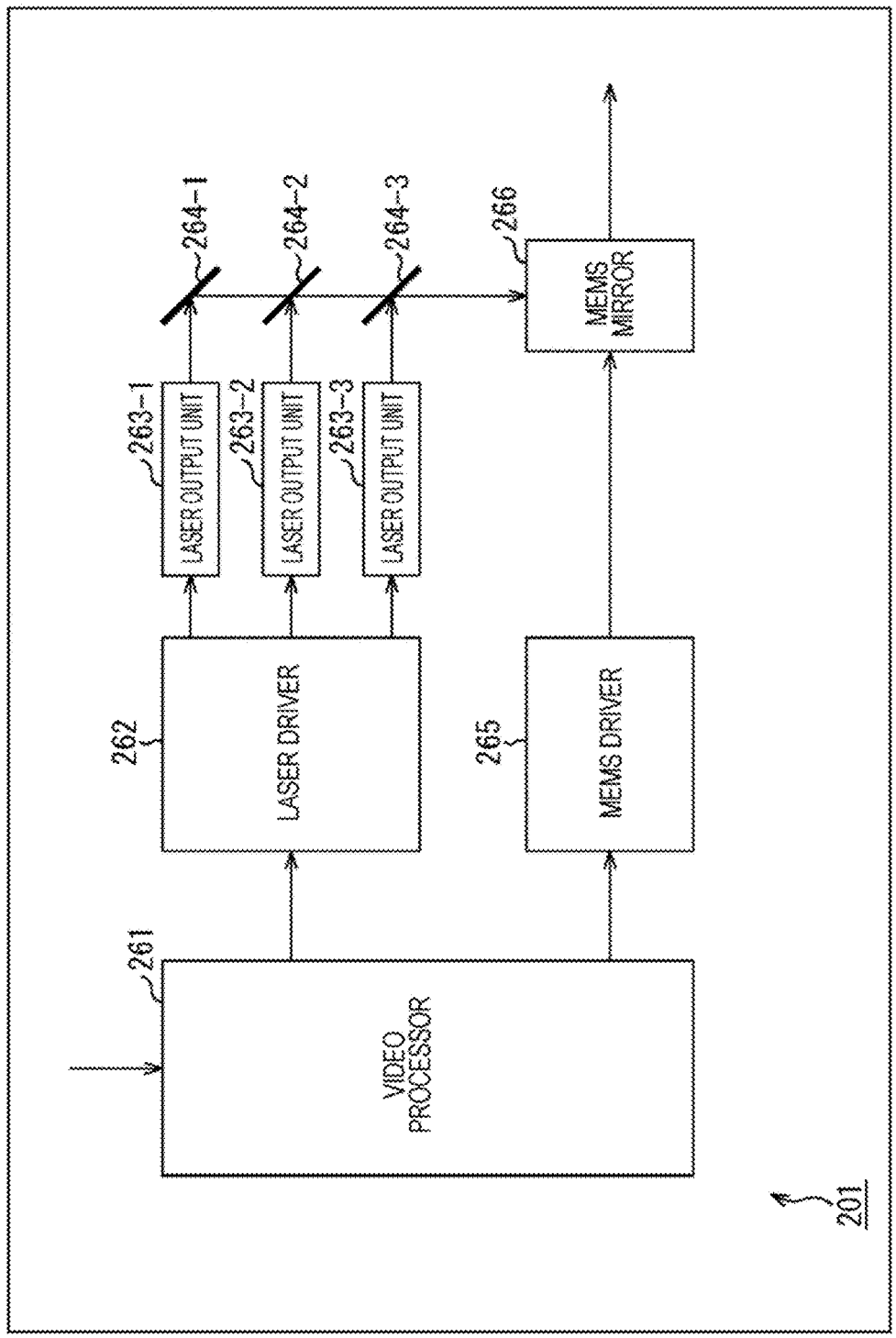
FIG. 17 is a diagram of an exemplary main configuration of a projecting unit.

FIG. 17 illustrates an exemplary main configuration of the projecting unit 201 in a case where a laser beam is used as the light source. In FIG. 17, the projecting unit 201 includes a video processor 261, a laser driver 262, a laser output unit 263-1, a laser output unit 263-2, a laser output unit 263-3, a mirror 264-1, a mirror 264-2, a mirror 264-3, a micro electro mechanical systems (MEMS) driver 265, and a MEMS mirror 266.

The video processor 261 retains an image supplied from the control unit 221 and performs image processing necessary for the image. The video processor 261 supplies the image to be projected, to the laser driver 262 and the MEMS driver 265.

The laser driver 262 controls the laser output units 263-1 to 263-3 to project the image supplied from the video processor 261. For example, the laser output units 263-1 to 263-3 output laser beams having mutually different colors (wavelength bands), such as read, blue, green, and the like. That is, the laser driver 262 controls the laser output of each color to project the image supplied from the video processor 261. Note that the laser output units 263-1 to 263-3 are each referred to as a laser output unit 263 in a case where there is no need to describe the laser output units 263-1 to 263-3 to be mutually distinguished.

The mirror 264-1 reflects the laser beam output from the laser output unit 263-1 so as to guide the laser beam to the MEMS mirror 266. The mirror 264-2 reflects the laser beam output from the laser output unit 263-2 so as to guide the laser beam to the MEMS mirror 266. The mirror 264-3 reflects the laser beam output from the laser output unit 263-3 so as to guide the laser beam to the MEMS mirror 266. Note that the mirrors 264-1 to 264-3 are each referred to as a mirror 264 in a case where there is no need to describe the mirrors 264-1 to 264-3 to be mutually distinguished.

The MEMS driver 265 controls mirror drive of the MEMS mirror 266 to project the image supplied from the video processor 261. The MEMS mirror 266 drives a mirror (a glass) attached on MEMS in accordance with the control of the MEMS driver 265, so as to scan the respective laser beams having the colors as illustrated in an example in FIG. 18. The laser beams are output to the outside of the image projecting and capturing device 200 so as to be emitted onto the projected surface 210, for example. With this arrangement, the image supplied from the video processor 261 is projected onto the projected surface 210.

Note that the description in which the three laser output units 263 are provided so as to output the laser beams having the three colors, has been given in the example in FIG. 17, but the number of the laser beams (or the number of the colors) is arbitrary. For example, the number of the laser output units 263 may be four or more, or may be two or less.

That is, the number of the laser beams output from the image projecting and capturing device 200 (the projecting unit 201) may be two or less, or may be four or more. In addition, the number of the colors of the laser beams output from the image projecting and capturing device 200 (the projecting unit 201) is also arbitrary, and thus may be two or less or may be four or more. In addition, the configuration of the mirrors 264 and the MEMS mirror 266 is also arbitrary, and thus is not limited to the example in FIG. 17. Needless to say, the scanning pattern of each laser beam is arbitrary, and thus is not limited to the example in FIG. 18.

<Configuration of Functional Block>

Figure 19:
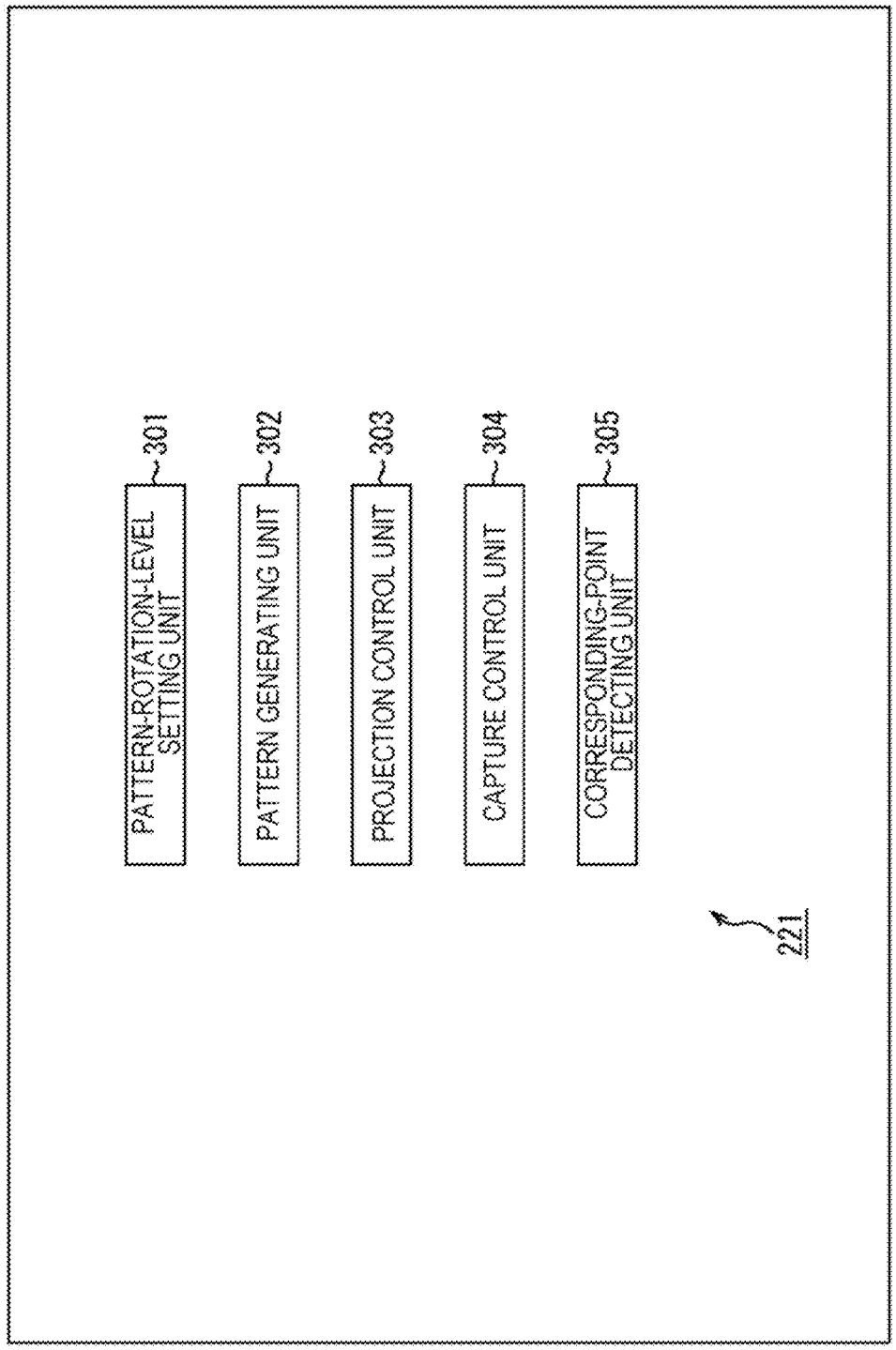
FIG. 19 is a functional block diagram of exemplary main functions achieved by a control unit.

FIG. 19 is a functional block diagram of exemplary main functions achieved by the control unit 221. As illustrated in FIG. 19, the control unit 221 achieves the functional blocks of a pattern-rotation-level setting unit 301, a pattern generating unit 302, a projection control unit 303, a capture control unit 304, a corresponding-point detecting unit 305, and the like.

For the rotation of a pattern, the pattern-rotation-level setting unit 301 performs processing relating to a setting of the rotation level thereof. The pattern generating unit 302 performs processing relating to generation of the pattern to be projected. The projection control unit 303 performs processing relating to the image projection control of the projecting unit 201. The capture control unit 304 performs processing relating to the capture control of the capturing unit 202. The corresponding-point detecting unit 305 performs processing relating to the corresponding-point detection in pixel between the projecting unit and the capturing unit.

The CPU 231 of the control unit 221 executes the program read from the RAM 233, the storage unit 243, or the like, with the RAM 233, or performs processing to the data that is generated by executing the program or read from the RAM 233, the storage unit 243, or the like, with the RAM 233 so that the functions are achieved.

Note that the exemplary functions achieved by the control unit 221 are not limited to the exemplary functional blocks described above. The control unit 221 may achieve a function other than the functions described above, or partially omit the functional blocks described above.

<Flow of Corresponding-Point Detection Processing>

Next, an exemplary flow of corresponding-point detection processing performed by the control unit 221 with the functional blocks, will be described with reference to a flow chart in FIG. 20.

When the corresponding-point detection processing starts, the pattern-rotation-level setting unit 301 to the capture control unit 304 set a pattern rotation level at step S101. The pattern-rotation-level setting unit 301 to the capture control unit 304 perform the processing in a case where the pattern generating unit 302 rotates a sinusoidal pattern so as to generate the projected pattern of the example of "Rotation of Sinusoidal Pattern" described with reference to FIGS. 12A, 12B, 12C, 12D and 12E orthe projected pattern of the example of "Periodic Phase Inversion and Rotation of Sinusoidal Pattern" described with reference to FIGS. 13A, 13B, 13C, 13D, 14A and 14B.

The processing can be omitted in a case where the pattern generating unit 302 uses a different method to generate the projected pattern, in a case where the pattern generating unit 302 generates the projected pattern of the example of "Periodic Phase Inversion of Sinusoidal Pattern" described with reference to FIGS. 8A, 8B, 8C, 9A, 9B, 9C, 10A, 10B, 10C, 11A and 11B, or in a case where the pattern generating unit 302 generates no projected pattern. The details of this processing will be described later.

At step S102, the pattern generating unit 302 generates a projected pattern. The method of generating the projected pattern is arbitrary. In a case where the projected pattern of the example of "Rotation of Sinusoidal Pattern" described with reference to FIGS. 12A, 12B, 12C, 12D and 12E or the projected pattern of the example of "Periodic Phase Inversion and Rotation of Sinusoidal Pattern" described with reference to FIGS. 13A, 13B, 13C, 13D, 14A and 14B is generated with the sinusoidal pattern rotated, the pattern generating unit 302 may generate the projected pattern, for example, with the sinusoidal pattern including repetition in a predetermined direction, rotated by the pattern rotation level set at step S101.

In addition, in a case where the projected pattern of the example of "Periodic Phase Inversion of Sinusoidal Pattern" described with reference to FIGS. 8A 8B, 8C, 9A, 9B, 9C, 10A, 10B, 10C, 11A and 11B or the projected pattern of the example of "Periodic Phase Inversion and Rotation of Sinusoidal Pattern" describedwith reference to FIGS. 13A, 13B, 13C, 13D, 14A and 14B is generated, the pattern generating unit 302 may generate the projected pattern, for example, with the sinusoidal pattern inverted in phase on the basis of the phase inverted pattern.

In a case where the projected pattern of the example of "Periodic Phase Inversion and Rotation of Sinusoidal Pattern" described with reference to FIGS. 13A, 13B, 13C, 13D, 14A and 14B is generated, the pattern generating unit 302 may generate the projected pattern, for example, with the sinusoidal pattern including the repetition in the predetermined direction, rotated and furthermore with the rotated sinusoidal pattern inverted in phase on the basis of the phase inverted pattern.

Note that data, such as a sinusoidal pattern used to generate a projected pattern by the pattern generating unit 302, may be stored in the ROM 232, the storage unit 243, or the like, may be stored in the removable medium 251, or may be acquired from a different device or the like through the communication unit 244. In addition, the data may be image data or may be data with which the image of the sinusoidal pattern can be generated, other than the image data.

Furthermore, data of the projected pattern generated by the pattern generating unit 302 may be stored in the storage unit 243 or the like. In addition, the data may be image data or may be data with which the image of the projected pattern can be generated, other than the image data.

Note that the processing can be omitted in a case where the pattern generating unit 302 generates no projected pattern. For example, data of the projected pattern projected by the projecting unit 201 may be stored in the ROM 232, the storage unit 243, or the like. In addition, for example, the data of the projected pattern projected by the projecting unit 201 may be supplied from the outside of the image projecting and capturing device 200 through the communication unit 244. In addition, for example, the data of the projected pattern projected by the projecting unit 201 may be read from the removable medium 251 by the drive 245. For example, in the cases, the generation of the projected pattern can be omitted.

At step S103, the pattern generating unit 302 to the capture control unit 304 perform region setting processing so as to set the phase inverted region and the phase non-inverted region. For example, in a case where the pattern generating unit 302 generates the projected pattern of the example of "Periodic Phase Inversion of Sinusoidal Pattern" described with reference to FIGS. 8A, 8B, 8C, 9A, 9B, 9C, 10A, 10B, 10C, 11A and 11B or the projected pattern of the example of "Periodic Phase Inversion and Rotation of Sinusoidal Pattern" described with reference to FIGS. 13A, 13B, 13C, 13D, 14A and 14B, the processing is performed so that the phase inverted region and the phase non-inverted region may be set. The method of setting the regions is arbitrary. For example, the processing may be performed with the region setting patterns described above. The details of the processing in that case will be described later.

In other words, for example, the processing can be omitted in a case where the pattern generating unit 302 generates the projected pattern of the example of "Rotation of Sinusoidal Pattern" described with reference to FIGS. 12A, 12B, 12C, 12D and 12E or in a case where no projected pattern is generated.

At step S104, the projection control unit 303 projects a pattern. The projection control unit 303 supplies the projected pattern generated by the processing at step S102, the projected pattern read from the ROM 232, the storage unit 243, the removable medium 251, or the like, or the projected pattern supplied from the outside of the image projecting and capturing device 200 through the communication unit 244, to the projecting unit 201, and then controls the projecting unit 201 to project the projected pattern, as an image, onto the projected surface 210.

For example, the projection control unit 303 allows the projecting unit 201 to project the projected pattern of the example of "Periodic Phase Inversion of Sinusoidal Pattern" described with reference to FIGS. 8A, 8B, 8C, 9A, 9B, 9C, 10A, 10B, 10C, 11A and 11B, the projected pattern of the example of "Rotation of Sinusoidal Pattern" described with reference to FIGS. 12A, 12B, 12C, 12D and 12E, or the projected pattern of the example of "Periodic Phase Inversion and Rotation of Sinusoidal Pattern" described with reference to FIGS. 13A, 13B, 13C, 13D, 14A and 14B.

Note that the processing can be omitted in a case where the image projecting and capturing device 200 projects no projected pattern (e.g., in a case where processing relating to the corresponding-point detection is only performed or in a case where processing relating to the capture of a projected image and the corresponding-point detection is performed).

At step S105, the capture control unit 304 allows a projected image to be captured. For example, the capture control unit 304 controls the capturing unit 202 to capture the projected image of the projected pattern of the example of "Periodic Phase Inversion of Sinusoidal Pattern" described with reference to FIGS. 8A, 8B, 8C, 9A, 9B, 9C, 10A, 10B, 10C, 11A and 11B, the projected image of the projected pattern of the example of "Rotation of Sinusoidal Pattern" described with reference to FIGS. 12A, 12B, 12C, 12D and 12E, or the projected image of the projected pattern of the example of "Periodic Phase Inversion and Rotation of Sinusoidal Pattern" described with reference to FIGS. 13A, 13B, 13C, 13D, 14A and 14B, the projected image being projected onto the projected surface 210, so as to acquire the captured image of the projected image.

Note that the processing can be omitted in a case where the image projecting and capturing device 200 captures no projected image (e.g., in a case where processing relating to the generation of the projected pattern and the projection control is only performed or in a case where the processing relating to the corresponding-point detection is only performed).

At step S106, the corresponding-point detecting unit 305 acquires the phase of each position of the captured image so as to detect the corresponding point. For example, the corresponding-point detecting unit 305 detects the corresponding point with the captured image including the projected image of the projected pattern captured, by the various methods described with reference to FIGS. 8A, 8B, 8C, 9A, 9B, 9C, 10A, 10B, 10C, 11A, 11B, 12A, 12B, 12C, 12D, 12E, 13A, 13B, 13C, 13D, 14A and 14B.

When the corresponding point is detected as described above, the processing at step S106 is completed so that the corresponding-point detection processing is completed.

As described above, the corresponding point is acquired with the projected pattern of each example described with reference to FIGS. 8A, 8B, 8C, 9A, 9B, 9C, 10A, 10B, 10C, 11A, 11B, 12A, 12B, 12C, 12D, 12E, 13A, 13B, 13C, 13D, 14A and 14B, by the methods described with reference to FIGS. 8A, 8B, 8C, 9A 9B, 9C, 10A, 10B, 10C, 11A, 11B, 12A, 12B, 12C, 12D, 12E, 13A, 13B, 13C, 13D, 14A and 14B so that the image projecting and capturing device 200 can inhibit the corresponding-point detection accuracy from degrading.

<Flow of Pattern-Rotation-Level Setting Processing>

Next, an exemplary flow of pattern-rotation-level setting processing performed at step S101 in FIG. 20, will be described with reference to a flow chart in FIG. 21. The pattern-rotation-level setting unit 301 performs the processing and then sets a pattern rotation level θ so that the angle of the repeating direction of the projected pattern of the projected image has a desired angle (an angle in a desired range) with respect to the captured image (e.g., the horizontal direction of the captured image).

When the pattern-rotation-level setting processing starts, the pattern-rotation-level setting unit 301 determines whether a relative angle in the rotating direction of the captured image with respect to the projected image is unknown, at step S121. That is, the pattern-rotation-level setting unit 301 determines whether the relative attitude in the rotating direction between the projecting unit that projects the projected pattern and the capturing unit that captures the projected image, is known.

For example, the relative angle is unknown in a case where the relative attitude in the rotation direction of the capturing unit with respect to the projecting unit has not been previously determined (in a case where installation can be made with an arbitrary attitude), similarly to a case where the projecting unit and the capturing unit are separately formed. That is, it is unknown at what angle the projected image slants in the captured image.

The processing proceeds to step S122 in a case where it is determined that the relative angle is unknown, in this manner. At step S122, the pattern-rotation-level setting unit 301 sets the pattern rotation level θ to be an initial value. The pattern rotation level θ indicates an angle by which a pattern is rotated (e.g., a sinusoidal pattern) in generating the projected pattern. The initial value is arbitrary. For example, "0°" may be provided or an angle other than "0°" may be provided.

At step S123, the pattern generating unit 302 rotates the pattern with the pattern rotation level θ. That is, the pattern generating unit 302 rotates, for example, the sinusoidal pattern that has been previously prepared, by an angle specified with the pattern rotation level θ. Needless to say, the method of generating the pattern rotated by the pattern rotation level θ from the pattern that has been previously prepared, is arbitrary.

At step S124, the projection control unit 303 supplies the pattern generated at step S123, as the projected pattern, to the projecting unit 201, and controls the projecting unit 201 to project the projected pattern, as an image, onto the projected surface 210.

At step S125, the capture control unit 304 controls the capturing unit 202 to capture the projected image projected onto the projected surface 210 by the processing at step S124, so as to acquire the captured image of the projected image.

At step S126, the pattern-rotation-level setting unit 301 acquires the rotation level of the repeating direction of the projected pattern of the projected image included in the captured image acquired by the processing at step S125, with respect to the captured image. For example, the pattern-rotation-level setting unit 301 acquires at what angle the repeating direction of the projected pattern of the projected image slants with respect to the horizontal direction in the captured image. Needless to say, the direction being the reference of the rotation level, is arbitrary, and thus may be a different direction other than the horizontal direction in the captured image.

At step S127, the pattern-rotation-level setting unit 301 determines whether the rotation level acquired by the processing at step S126 is in a predetermined target range. The target range is arbitrary. For example, a target range of 40° to 50° with respect to the horizontal direction in the captured image may be provided. In that case, for example, when the repeating direction of the projected pattern of the projected image in the captured image, slants at an angle of 45° with respect to the horizontal direction in the captured image, the pattern-rotation-level setting unit 301 determines that the target range is satisfied.

Note that a target value may be used instead of the target range. In that case, the pattern-rotation-level setting unit 301 determines whether the rotation level acquired by the processing at step S126 is a predetermined target value. Needless to say, the target value is also arbitrary. For example, 45° may be provided with respect to the horizontal direction in the captured image.

When it is determined that the angle of the repeating direction of the projected pattern of the projected image in the captured image, is out of the target range, the processing proceeds to step S128.

At step S128, the pattern-rotation-level setting unit 301 increments the pattern rotation level θ by a predetermined angle (e.g. 10°). Needless to say, decrement may be performed. When the processing at step S128 is completed, the processing goes back to step S123 so that pieces of processing at step S123 and steps subsequent thereto are repeated. That is, each piece of processing described above is performed again with the pattern rotation level θ that has been updated.

In addition, in a case where it is determined at step S127 that the rotation level acquired by the processing at step S126 is in the target range, the processing proceeds to step S129.

At step S129, the pattern-rotation-level setting unit 301 sets the pattern rotation level θ to be a value at the point in time. That is, in generating the projected pattern, the sinusoidal pattern is rotated by the pattern rotation level θ set in this manner so that the angle of the repeating direction of the projected pattern in the captured image can be made to be the desired angle (an angle in the desired range). When the processing at step S129 is completed, the pattern-rotation-level setting processing is completed so that the processing goes back to FIG. 20.

Figure 21:
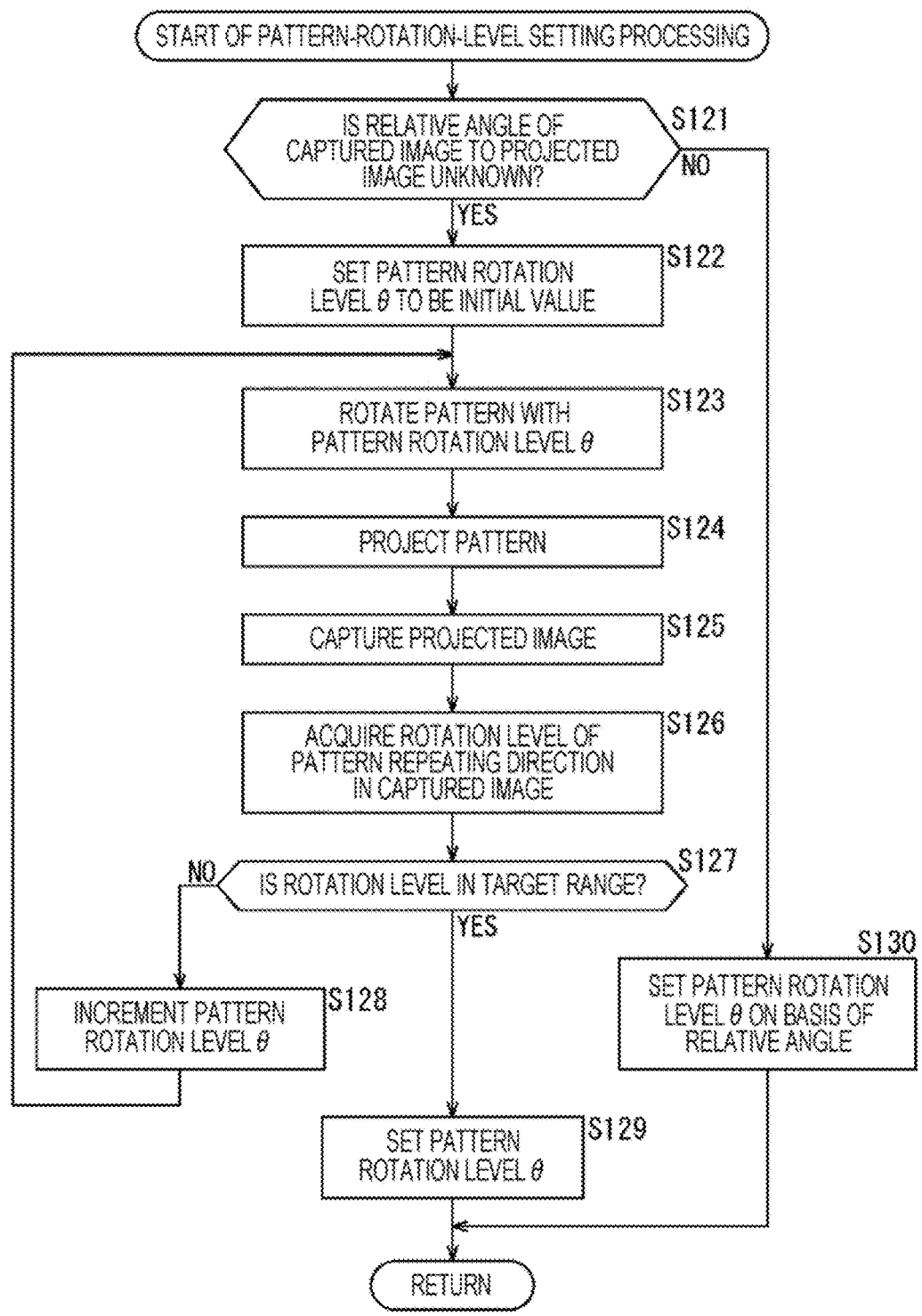
FIG. 21 is a flow chart for describing an exemplary flow of pattern-rotation- level setting processing.

In addition, in a case where it is determined that the relative angle of the captured image with respect to the projected image is known, at step S121 in FIG. 21, the processing proceeds to step S130. For example, in a case where the capturing unit is fixed with respect to the projecting unit and the relative attitude in the installation has been previously known, the pattern rotation level θ can be determined in response to the relative attitude.

Therefore, at step S130, the pattern-rotation-level setting unit 301 sets the pattern rotation level θ on the basis of the relative angle that has been known. In generating the projected pattern, the sinusoidal pattern is rotated by the pattern rotation level θ set in this manner so that the angle of the repeating direction of the projected pattern in the captured image can be made to be the desired angle (an angle in the desired range). When the processing at step S130 is completed, the pattern-rotation-level setting processing is completed so that the processing goes back to FIG. 20.

The pattern-rotation-level setting processing is performed as described above so that the repeating direction of the projected pattern in the captured image can be made at the desired angle (an angle in the desired range) regardless of the relative attitude between the projecting unit and the capturing unit. That is, the processing is performed so that the image projecting and capturing device 200 can more certainly generate the projected pattern of the example of "Rotation of Sinusoidal Pattern" described with reference to FIGS. 12A, 12B, 12C, 12D and 12E or the projected pattern of the example of "Periodic Phase Inversion and Rotation of Sinusoidal Pattern" described with reference to FIGS. 13A, 13B, 13C, 13D, 14A and 14B.

<Exemplary Flow of Region Setting Processing>

Figure 22:
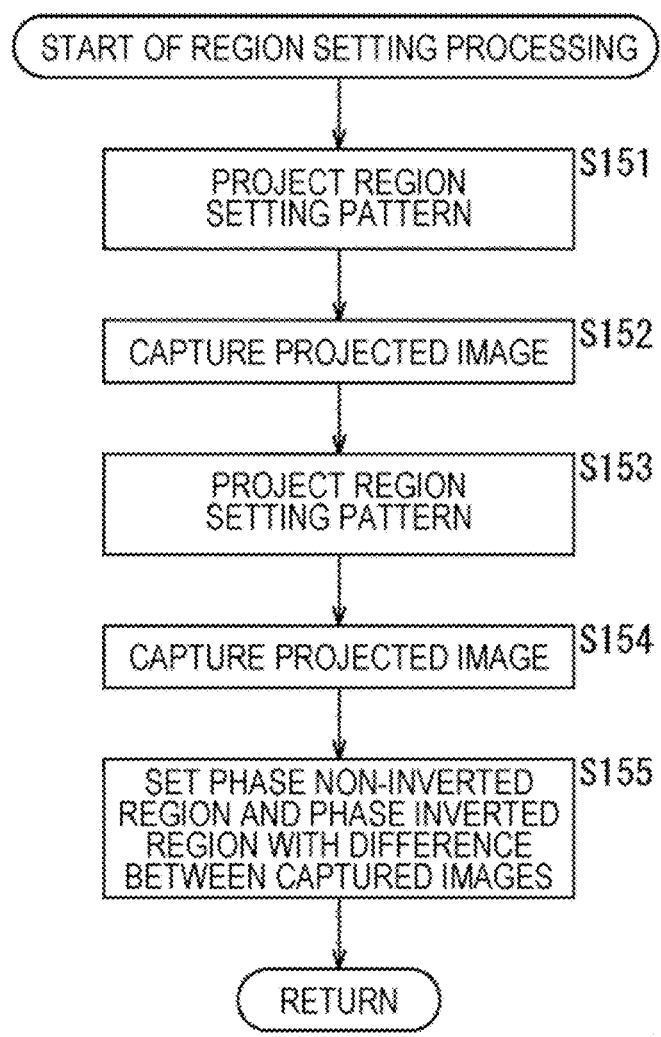
FIG. 22 is a flow chart for describing an exemplary flow of region setting processing.

Next, an exemplary flow of the region setting processing performed at step S103 in FIG. 20, will be described with reference to a flow chart in FIG. 22.

When the region setting processing starts, at step S151, the projection control unit 303 supplies a first region setting pattern, such as the region setting pattern 141 or the region setting pattern 181, to the projecting unit 201, so as to control the projecting unit 201 to project the region setting pattern, as an image, onto the projected surface 210.

At step S152, the capture control unit 304 controls the capturing unit 202 to capture the projected image projected onto the projected surface 210 by the processing at step S151, so as to acquire the captured image at step S152.

At step S153, the projection control unit 303 supplies a second region setting pattern (a pattern including each region in the first region setting pattern, inverted), such as the region setting pattern 142 or the region setting pattern 182, to the projecting unit 201, so as to control the projecting unit 201 to project the region setting pattern, as an image, onto the projected surface 210, at step S151.

At step S154, the capture control unit 304 controls the capturing unit 202 to capture the projected image projected onto the projected surface 210 by the processing at step S151, so as to acquire the captured image, at step S152.

Figure 18:
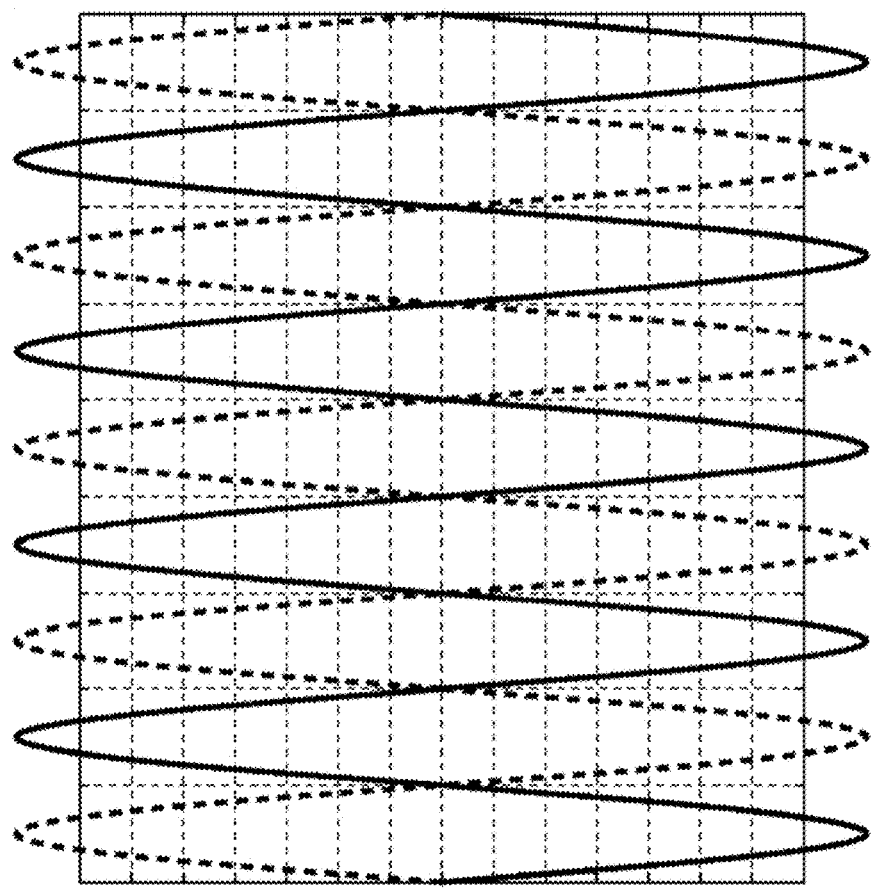
FIG. 18 is a chart of an exemplary scanning state of a laser beam.

At step S155, the pattern generating unit 302 acquires the difference between the captured image acquired by the processing at step S152 and the captured image acquired by the processing at step S154, so as to set the phase non-inverted region and the phase inverted region with the difference, similarly to the examples described with reference to FIGS. 14A, 14B and 18. The setting method is arbitrary, and thus is not limited to the example described above.

Figure 20:
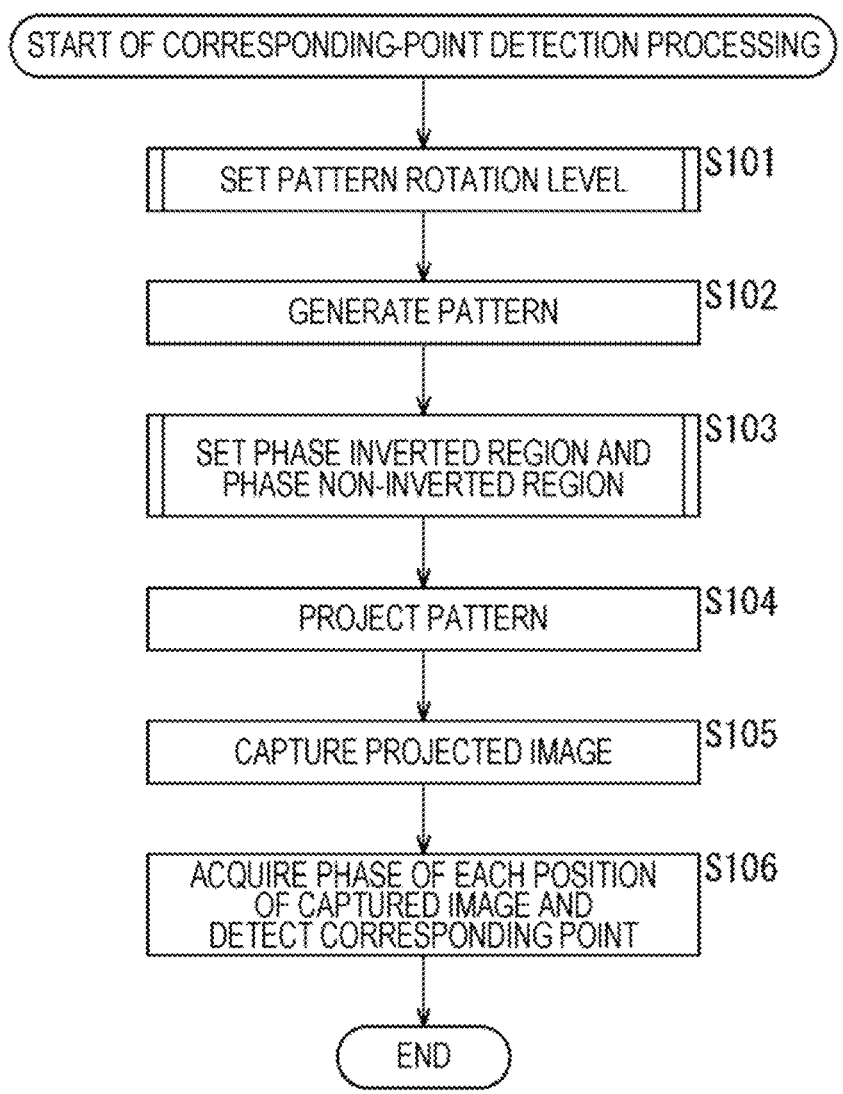
FIG. 20 is a flow chart for describing an exemplary flow of corresponding- point detection processing.

When the processing at step S155 is completed, the region setting processing is completed so that the processing goes back to FIG. 20.

The region setting processing is performed as described above and then the phase non-inverted region and the phase inverted region are set so that the image projecting and capturing device 200 can improve the tolerance against noise in the corresponding-point detection.

<4. Third Embodiment>
<Applications>

The configuration of the image projecting and capturing device to which the present technology has been applied, is not limited to the example described above. That is, the present technology can be also applied to the image projecting and capturing device having a configuration different from that in the example described above.

For example, the numbers of the projecting units 201 and the capturing units 202 are arbitrary, and thus may be at least two. In addition, the number of the projecting unit 201 and the number of the capturing unit 202 do not necessarily agree with each other. For example, the present technology can be also applied to an image projecting and capturing device 400 including three projecting units 201 (a projecting unit 201-1, a projecting unit 201-2, and a projecting unit 201-3) and two capturing units 202 (a capturing unit 202-1 and a capturing unit 202-2) as illustrated in FIG. 23A.

In a case where a plurality of the projecting units 201 and a plurality of the capturing units 202 are present similarly to the image projecting and capturing device 400, mutual corresponding points are at least detected for all the combinations of the projecting units 201 and the capturing units 202 with the various methods described above in the first and second embodiments.

Figure 23A:
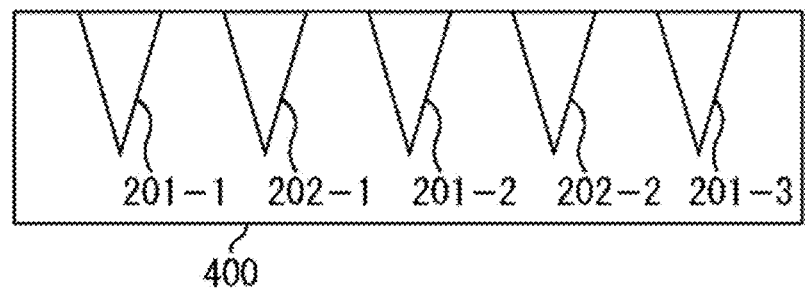
FIGS. 23A, 23B and 23C are diagrams of exemplary main configurations of an image projecting and capturing device and an image projecting and capturing system.

Note that the positional relationship between the projecting units 201 and the capturing units 202 is rightfully arbitrary, and thus is not limited to the examples in FIG. 15 and FIG. 23A.

In addition, the control unit 221 of the image projecting and capturing device 200 may be formed as one device independent of the projecting unit 201 and the capturing unit 202. For example, the present technology can be also applied to an image projecting and capturing system 410 illustrated in FIG. 23B.

Figure 23B:
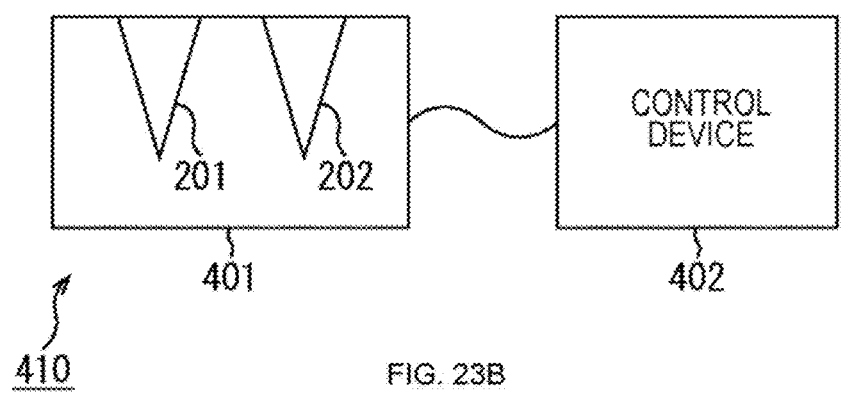

The image projecting and capturing system 410 illustrated in FIG. 23B includes an image projecting and capturing device 401 and a control device 402, and the entire system performs processing similar to that of the image projecting and capturing device 200. The image projecting and capturing device 401 includes aprojecting unit 201 and a capturing unit 202. The control device 402 has a configuration equivalent to that of the control unit 221 in the image projecting and capturing device 200, and performs processing equivalent to that of the control unit 221. That is, the control device 402 is coupled to the image projecting and capturing device 401 through a cable or the like, and is capable of controlling the projecting unit 201 and the capturing unit 202 in the image projecting and capturing device 401, performing processing relating to the corresponding-point detection in pixel between the projecting unit 201 and the capturing unit 202, and generating a projected pattern.

Furthermore, the projecting unit 201 and the capturing unit 202 may be formed to be mutually independent devices. For example, the present technology can be also applied to an image projecting and capturing system 410 illustrated in FIG. 23C.

Figure 23C:
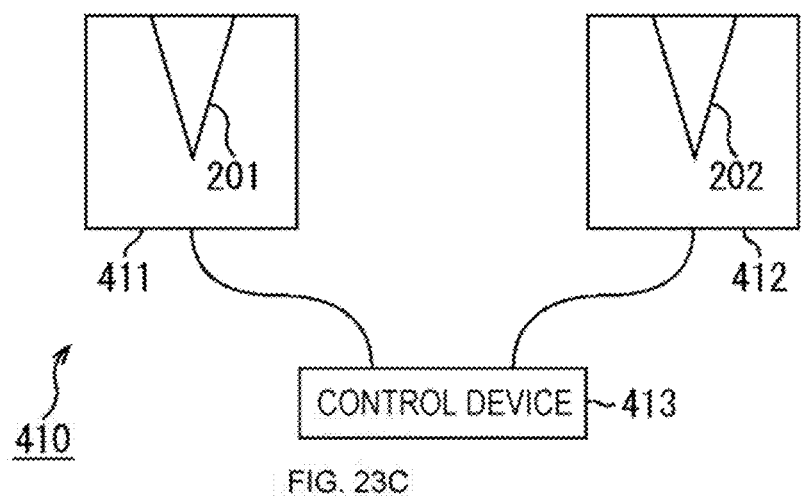

The image projecting and capturing system 410 illustrated in FIG. 23C includes a projecting device 411, a capturing device 412, and a control device 413, and the entire system performs processing similar to that of the image projecting and capturing device 200. The projecting device 411 includes a projecting unit 201. The capturing device 412 includes a capturing unit 202. The control device 413 is similar to the control device 402, and has a configuration equivalent to that of the control unit 221 in the image projecting and capturing device 200 so as to perform processing equivalent to that of the control unit 221. That is, the control device 413 is coupled to the projecting device 411 and the capturing device 412 through cables or the like, and is capable of controlling the projecting unit 201 of the projecting device 411 and the capturing unit 202 of the capturing device 412, performing processing relating to the corresponding-point detection in pixel between the projecting unit 201 and the capturing unit 202, and generating a projected pattern.

Needless to say, the numbers of the projecting units 201 and the capturing units 202 for the image projecting and capturing system 410 are arbitrary, and thus may be at least two or do not necessarily agree with each other. In addition, in a case where a system includes a plurality of devices each including the projecting unit 201 and/or the capturing unit 202, the configurations of the respective devices may be different from each other. For example, the image projecting and capturing device 401, the projecting device 411, and the capturing device 412 may coexist. In addition, a system may include the image projecting and capturing device 200 or the image projecting and capturing device 400. Needless to say, a system may include a projecting device, a capturing device, and an image projecting and capturing device, each having a configuration different from those in the examples.

Even with any of the configurations, mutual corresponding points are at least detected for all the combinations of the projecting units 201 and the capturing units 202, with the various methods described above in the first and second embodiments. The projecting unit 201 and the capturing unit 202 in each combination, are not necessarily included in the same device. For example, in FIG. 23C, a corresponding point is at least detected between the projecting unit 201 of the projecting device 411 and the capturing unit 202 of the capturing device 412, with the various methods described above.

Figure 24A:
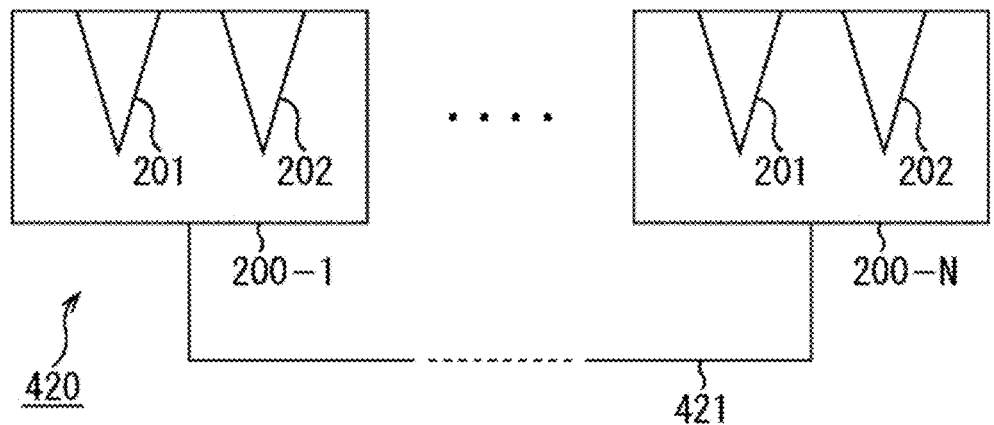
FIGS. 24A and 24B are diagrams of an exemplary main configuration of an image projecting and capturing system.

The present technology can be also applied to an image projecting and capturing system 420 including a plurality of image projecting and capturing devices 200 (image projecting and capturing devices 200-1 to 200-N (N is an integer of two or more)) coupled to be communicable with each other through a cable 421, as illustrated in FIG. 24A. That is, a plurality of control units 221 may be present. In that case, the control units 221 of the respective devices may cooperate with each other so as to perform processing as one control unit 221, or any of the control units 221 may independently operate as a master and the other control units 221 may dependently operate as slaves.

Figure 24B:
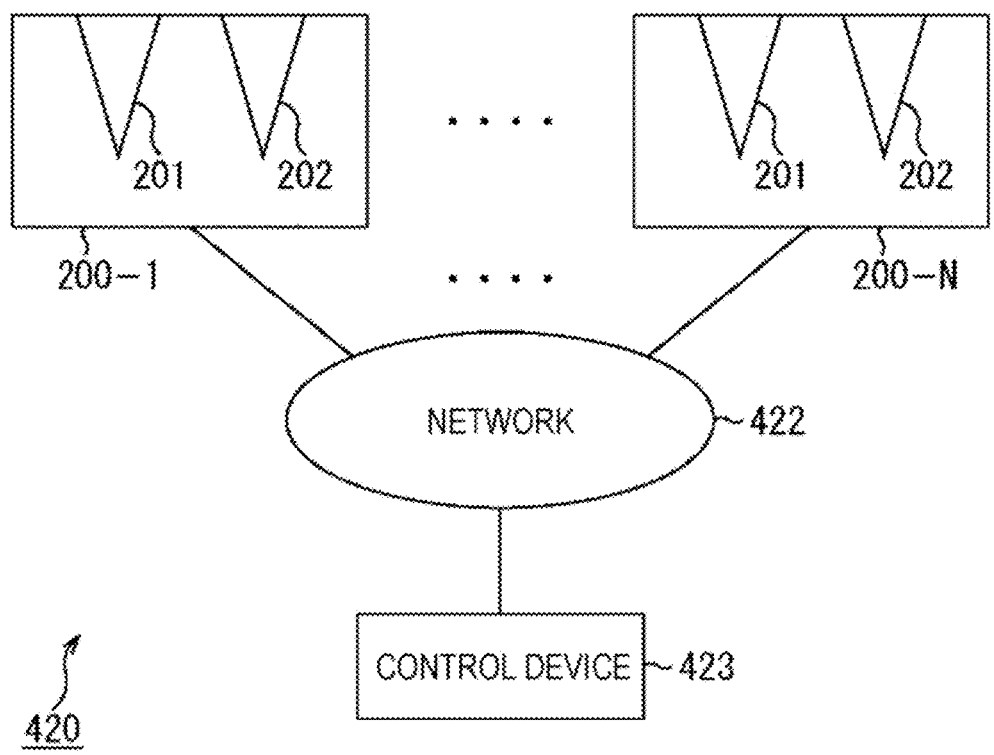

In addition, as illustrated in FIG. 24B, an image projecting and capturing system 420 may include a control device 423 independent of each image projecting and capturing device 200 provided, and the control device 423 may control each image projecting and capturing device 200. In the example in FIG. 24B, the control device 423 is coupled to the plurality of image projecting and capturing devices 200 (image projecting and capturing devices 200-1 to 200-N (N is an integer of two or more)) through a predetermined network 422 (e.g., the Internet or a LAN) so as to be communicable with the image projecting and capturing devices 200. The control device 423 at least detects corresponding points between all the projecting units 201 and the capturing units 202, with the various methods described above.

For example, the image projecting and capturing device 400, the image projecting and capturing systems 410, the image projecting and capturing systems 420 can project an image with the plurality of projecting units 201 cooperating with each other.

<Cooperative Projection>For example, content data including a progressive-scanning-system image (4k@60 p) with 4K resolution (e.g., 4096×2160) and a frame rate of 60 fps, is supplied to the image projecting and capturing system 420 (FIG. 24A). Each image projecting and capturing device 200 extracts a partial image allocated to itself (e.g., a progressive-scanning-system image (1080@60 P) with full HD resolution and a frame rate of 60 fps), from the image (4K @ 60 P) so as to project the partial image onto a projected surface.

For example, an image projecting and capturing devices 200-1, an image projecting and capturing devices 200-2, an image projecting and capturing devices 200-3, and an image projecting and capturing devices 200-4 in the image projecting and capturing system 420 are arranged so as to project images, as illustrated in FIG. 25A. In the example illustrated in FIG. 25A, the projected images of the image projecting and capturing devices 200 are projected on a projected surface 450 so as to be positioned in a 2×2 format including two formed vertically and two formed horizontally. More specifically, a projected image 451-1 of the image projecting and capturing device 200-1, is projected at the upper left on the projected surface 450, a projected image 451-2 of the image projecting and capturing device 200-2, is projected at the upper right on the projected surface 450, a projected image 451-3 of the image projecting and capturing device 200-3, is projected at the lower left on the projected surface 450, and a projected image 451-4 of the image projecting and capturing device 200-4, is projected at the lower right on the projected surface 450.

As illustrated in FIG. 25A, the projected images 451 (the projected images 451-1 to 451-4) are partially superimposed on each other so as to form one region. The projected images 451 include the partial images (1080@60 p) described above so that a projected image 452 of the image (4K @ 60 P) is formed on the projected surface 450 in a state where the projection has been performed as illustrated in FIG. 25A. More specifically, the projected image 451-1 includes the partial image at the upper left of the projected image 452 (4K @ 60 P), the projected image 451-2 includes the partial image at the upper right of the projected image 452 (4K @ 60 P), the projected image 451-3 includes the partial image at the lower left of the projected image 452 (4K @ 60 P), and the projected image 451-4 includes the partial image at the lower right of the projected image 452 (4K @ 60 P). The projected images 451 are partially superimposed on each other as described above so that the partial image included in each projected image 451 may be an image having higher resolution than full HD (namely, having a wide range).

In this manner, the image projecting and capturing devices 200 cooperate with each other so that the image projecting and capturing system 420 can project the image having 4K resolution (4K @ 60 P), retaining the resolution (retaining the image quality).

Note that there is a need to position each projected image 451 and to perform geometric correction or the like, in order to achieve the projected image 452. Each image projecting and capturing device 200 can perform sensing to the projected image 451 projected by the projecting unit 201 of each image projecting and capturing device 200 with the capturing unit 202. In an example in FIG. 25B, the capturing unit 202 of the image projecting and capturing device 200-1 captures the projected image 451-4 of the image projecting and capturing device 200-4 (the partial image 452-4). Each control unit 221 performs various types of correction on the basis of such sensor data so that each partial image is composited in a more natural format on the projected surface 450 and then the one projected image 452 can be formed.

Examples of the details of image correction, include projector individual-difference correction, overlap correction, and screen-shape correction as illustrated in FIG. 25B. The projector individual-difference correction is for luminance, gamma, brightness, contrast, white balance, and coloration, for example. The overlap correction is for an overlap region including the projected images 451 mutually superimposed. For example, level correction and distortion correction are included. The screen-shape correction is for handling the shape and the attitude of the projected surface 450. For example, projective transformation (a plane, a spherical form, a cylindrical shape (a round column), and a polynominal curve) is included. Needless to say, correction other than these pieces of correction may be performed.

Figure 26:
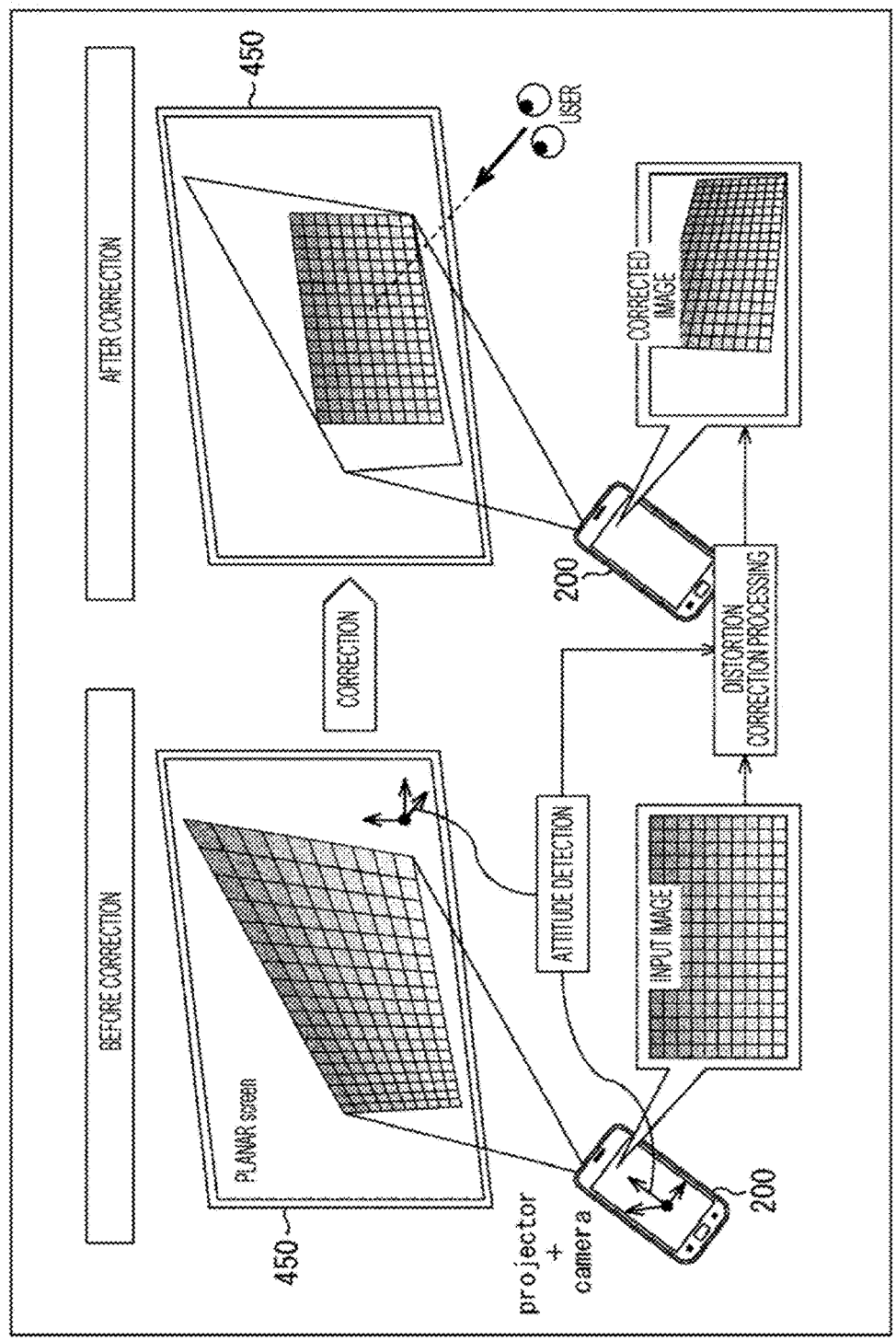
FIG. 26 is a view of the state of image correction.
Figure 27:
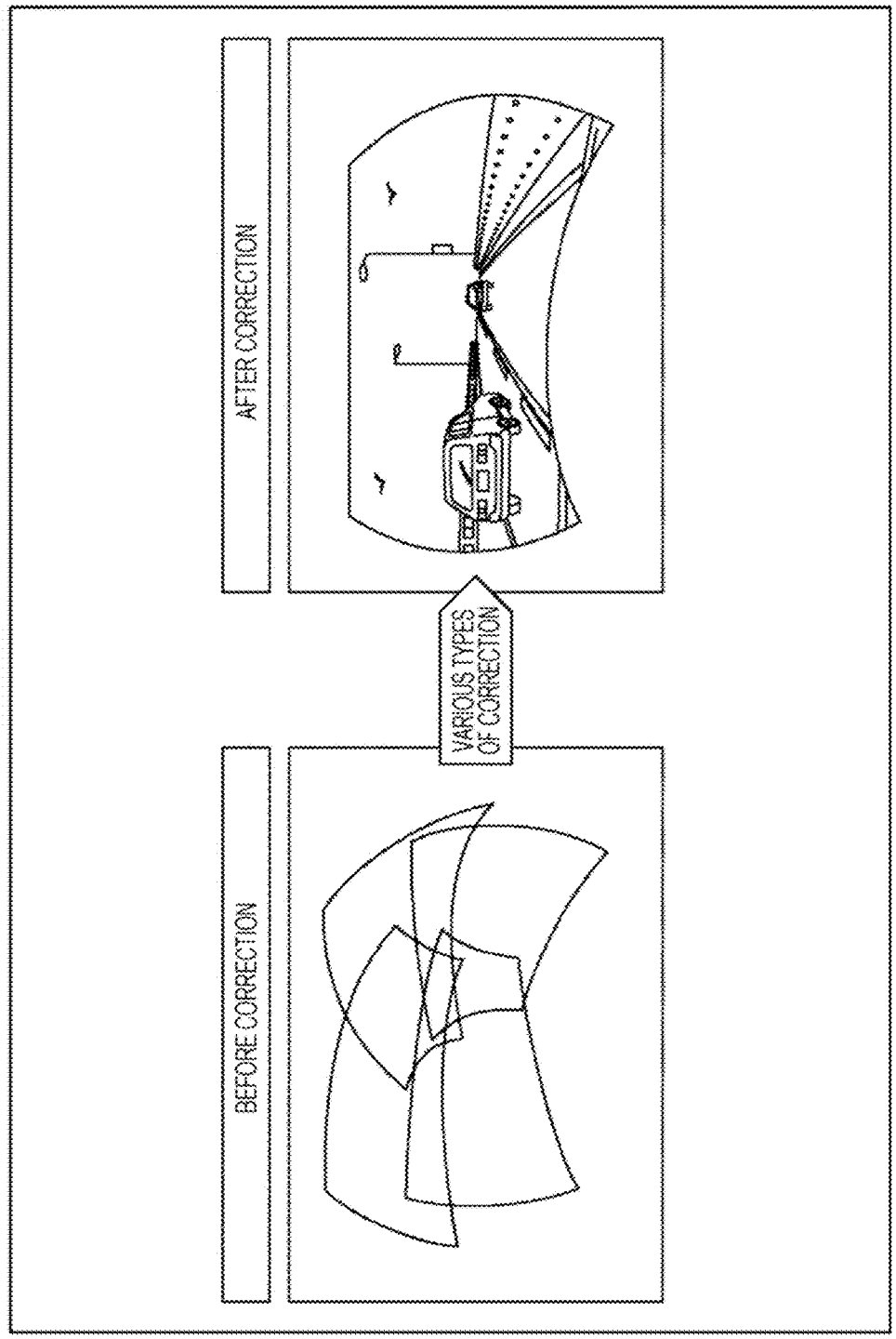
FIG. 27 is a view of the state of image correction.

For example, in a case where a projected surface 450 faces in a slant direction with respect to an image projecting and capturing device 200 as illustrated in FIG. 26, a projected image is distorted if no correction is performed, but the projective transformation or the like can reduce the distortion. In addition, in a case where a plurality of images is projected onto a curved surface as illustrated in an example in FIG. 27, the projective transformation or the like can perform the projection as one image.

There is a need to detect a corresponding point in pixel between each projecting unit 201 and each capturing unit 202, in order to perform the various types of correction. In that case, applying the present technology, namely, using the various methods described above in the first and second embodiments, can inhibit the corresponding-point detection accuracy from degrading. That is, the various types of correction can be performed more accurately so that the projected images can be inhibited from degrading in image quality.

Figure 28B:
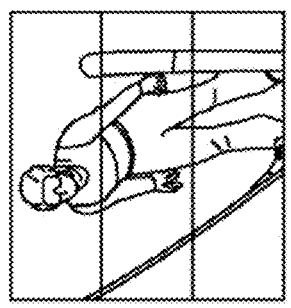
FIGS. 28A, 28B, 28C and 28D are views for describing exemplary utilization.
Figure 28D:
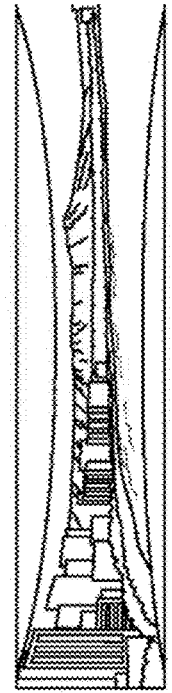
Figure 28A:
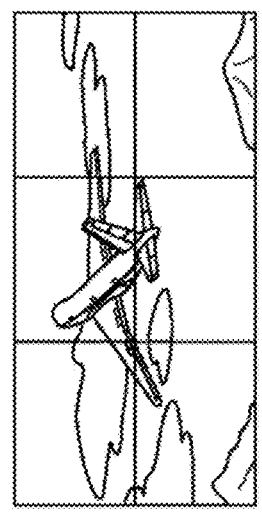

<Exemplary Utilization of Image Projecting and Capturing System>Using the image projecting and capturing system can perform various types of projection. For example, a plurality of projected images is arranged as illustrated in FIG. 28A so that a projected image can improve in resolution. In addition, on the basis of the arrangement of each projected image (each partial image) projected by each image projecting and capturing device 200 as illustrated in an example in FIG. 28B, the aspect ratio of an projected image (the entire image) can be flexibly set, being independent of the specifications for each image projecting and capturing device 200.

Figure 28C:

In addition, as illustrated in an example in FIG. 28C, an image can be projected onto a plurality of walls and a ceiling (namely, a screen facing in a plurality of directions (in other words, a solid structure)) without distortion. Furthermore, as illustrated in an example in FIG. 28D, an image can be also projected onto a wide-range and curved screen surrounding a viewer, without distortion.

Improving the flexibility for the projected surfaces, increases the expressive power of a projected image so that, for example, the realistic feeling and the visibility can improve and the entertainment and the artistic quality of expression can improve.

The present technology can be applied to the various image projecting and capturing systems that perform the various types of projection. In other words, applying the present technology can perform the various types of correction more accurately in the various projecting methods so that the projected images can be inhibited from degrading in image quality.

Note that the present technology has been described above to be applied to the image projecting and capturing devices and the image projecting and capturing systems that project images, and additionally the present technology can be applied to an arbitrary device and an arbitrary system that perform the corresponding-point detection in pixel between a projecting unit and a capturing unit. For example, the present technology can be applied to a device and a system that measure an object shape. In addition, a case where the present technology is applied to the phase-shift method (the multi-phase-shift method), has been described above, and additionally the present technology can be also applied to a corresponding-point detecting method, such as Gray code, other than the phase-shift method (the multi-phase-shift method).

<Software>

The pieces of processing in series described above can be performed by hardware or can be performed by software. In a case where the pieces of processing in series described above are performed by software, a program included in the software is installed from a network or a recording medium.

As illustrated in FIG. 16, the recording medium includes, for example, the removable medium 251 that has recorded the program, to be distributed in order to deliver the program to a user, the removable medium 251 being separated from the device body. Examples of the removable medium 251 include a magnetic disk (a flexible disk included) and an optical disc (a CD-ROM and a DVD included). Furthermore, a magneto-optical disc (a mini disc (MD) included), a semiconductor memory, and the like, are also included. In that case, for example, mounting the removable medium 251 on the drive 245 can read the program stored in the removable medium 251 so that the program can be installed into the storage unit 243.

In addition, the program can be also supplied through a transmission medium in wired communication or wireless communication, such as a local area network, the Internet, or digital satellite broadcasting. In that case, for example, the communication unit 244 receives the program so that the program can be installed into the storage unit 243.

Additionally, the program can be previously installed into a storage unit, a ROM, or the like. For example, the program can be previously installed into the storage unit 243, the ROM 232, or the like.

Note that the program executed by a computer may be a program for performing processing on a time series basis in the order described in the present specification, or may be a program for performing processing in parallel or with necessary timing with which a call is made.

In addition, in the present specification, a step at which the program recorded in the recording medium is described, includes not only the processing performed on the time series basis in the order described but also the processing performed in parallel or individually even when the processing is not necessarily performed on the time series basis.

In addition, the processing at each step described above can be performed in each device described above or in an arbitrary device other than each device described above. In that case, the device that performs the processing at least includes a function (e.g., a functional block) necessary for performing the processing. In addition, information necessary for the processing is at least transmitted to the device appropriately.

<Others>

In addition, in the present specification, a system means an aggregate including a plurality of constituent elements (e.g., a device and a module (a component)) regardless of whether all the constituent elements are included in the same housing. Therefore, a plurality of devices coupled through a network, the devices each being housed in a different housing, and one device including a plurality of modules housed in one housing, both cases are involved in the system.

In addition, a configuration described above as one device (or a processing unit) may be divided to form a plurality of devices (or processing units). Conversely, configurations described above as a plurality of devices (or processing units) may be collectively formed to form one device (or one processing unit). In addition, the configuration of each device (or each processing unit) may be added with a configuration other than the configurations described above. Furthermore, if the configuration or the operation of the entire system is substantially the same, the configuration of a device (or a processing unit) may be partially included in the configuration of a different device (or a different processing unit).

The preferred embodiments of the present disclosure have been described in detail with reference to the attached drawings, but the technical scope of the present disclosure is not limited to the examples. It is obvious that a person skilled in the technical field of the present disclosure conceives various alterations or modifications in the scope of the technical idea described in the claims, and thus it is understood that these rightfully belong to the technical scope of the present disclosure.

For example, the present technology can have the configuration of cloud computing that performs processing with a plurality of devices cooperating with each other, the devices including one function divided through a network.

In addition, each step described in the above flow charts can be divided into a plurality of devices so as to be performed, in addition to being performed by one device.

Furthermore, in a case where one step includes pieces of processing, the pieces of processing included in the one step can be divided into a plurality of devices so as to be performed, in addition to being performed by one device.

In addition, the present technology is not limited to this and thus can be also performed with any configurations built in the devices or devices included in a system, for example, a processor being a system large scale integration (LSI), a module using a plurality of processors, an unit using a plurality of modules, or a set including the unit further added with a different function (namely, a partial configuration of a device).

Note that the present technology can have the following configurations.

<Projection Control: Phase Inversion>

(1) An information processing device includes: a projection control unit configured to allow a projecting unit to project a second pattern including a first pattern including repetition in first cycles in a first direction, inverted in phase in second cycles in a second direction orthogonal to the first direction, in order to acquire corresponding relationship in pixel between the projecting unit and a capturing unit.

(2) According to the information processing device described in (1), the first pattern includes a predetermined parameter sinusoidally varying.

(3) According to the information processing device described in (2), the parameter is luminance.

(4) According to the information processing device described in any of (1) to (3), the first direction is different from a direction in which a phase is detected.

(5) According to the information processing device described in any of (1) to (4), the first direction slants at an angle in a predetermined range with respect to a vertical direction in a captured image captured and acquired by the capturing unit.

(6) According to the information processing device described in (5), the range is between 40° to 50°.

(7) According to the information processing device described in any of (1) to (6), the projection control unit allows the projecting unit to project a third pattern including repetition in the second cycles in the second direction and a fourth pattern including the third pattern inverted in phase before the second pattern is projected.

(8) According to the information processing device described in (7), the third pattern and the fourth pattern include binary repeated in the second cycles in the second direction, the binary including mutually opposite phases.

(9) According to the information processing device described in any of (1) to (8), the projection control unit further allows the projecting unit to project a fifth pattern including the first pattern including the repetition in the first cycles in the second direction, inverted in phase in the second cycles in the first direction.

(10) According to the information processing device described in any of (1) to (9), the projection control unit allows the projecting unit to project a plurality of the second patterns including the first patterns mutually shifted in phase.

(11) According to the information processing device described in (10), the projection control unit allows the projecting unit to project a trio of the second patterns including the first patterns mutually shifted by 120° in phase.

(12) According to the information processing device described in any of (1) to (11), the projection control unit allows the projecting unit to project images of a plurality of the second patterns including the first cycles different from each other.

(13) The information processing device described in any of (1) to (12), further includes: a generating unit configured to generate the second pattern. The projection control unit allows the projecting unit to project the second pattern generated by the generating unit.

(14) According to the information processing device described in (13), the generating unit inverts the first pattern including the repetition in the first cycles in the first direction, in phase in the second cycles in the second direction so as to generate the second pattern.

(15) According to the information processing device described in (13), the generating unit varies a repeating direction of the first pattern including the repetition in the first cycles to the first direction and further inverts the first pattern in phase in the second cycles in the second direction so as to generate the second pattern.

(16) The information processing device described in any of (11) to (15), further includes: a storage unit configured to store data of the first patterns. The generating unit generates the second patterns with the first patterns stored in the storage unit.

(17) The information processing device described in (1) to (16), further includes: the projecting unit configured to project the second pattern onto a projected surface in accordance with the control of the projection control unit.

(18) The information processing device described in any of (1) to (17), further includes: the capturing unit configured to capture a projected image of the second pattern projected by the projecting unit so as to acquire a captured image.

(19) The information processing device described in any of (1) to (18), further includes: a corresponding-point detecting unit configured to detect a corresponding point in pixel between the projecting unit and the capturing unit with a captured image of a projected image of the second pattern projected by the projecting unit, the captured image being acquired by the capturing unit.

(20) An information processing method includes: allowing a projecting unit to project a second pattern including a first pattern including repetition in first cycles in a first direction, inverted in phase in second cycles in a second direction orthogonal to the first direction, in order to acquire corresponding relationship in pixel between the projecting unit and a capturing unit.

<Corresponding-Point Detection: Phase Inversion>

(21) An information processing device includes: a corresponding-point detecting unit configured to detect a corresponding point in pixel between a projecting unit and a capturing unit with a captured image acquired by capturing a projected image of a second pattern including a first pattern including repetition in first cycles in a first direction, inverted in phase in second cycles in a second direction orthogonal to the first direction, by the capturing unit, the projected image being projected onto a projected surface by the projecting unit.

(22) According to the information processing device described in (21), the first pattern includes a predetermined parameter sinusoidally varying.

(23) According to the information processing device described in (22), the parameter is luminance.

(24) According to the information processing device described in (22) or (23), the corresponding-point detecting unit acquires, as a phase, a variation in the parameter so as to detect the corresponding point on the basis of the phase.

(25) According to the information processing device described in (24), the corresponding-point detecting unit inverts the phase so as to detect the corresponding point, for a region inverted in phase in the second pattern.

(26) According to the information processing device described in (25), the corresponding-point detecting unit acquires the region inverted in phase in the second pattern, with a captured image of a projected image of a third pattern including repetition in the second cycles in the second direction and a captured image of a projected image of a fourth pattern including the third pattern inverted in phase, the projected images being projected by the projecting unit before the second pattern is projected, the captured images being acquired by the capturing unit.

(27) According to the information processing device described in (26), the third pattern and the fourth pattern include binary repeated in the second cycles in the second direction, the binary including mutually opposite phases.

(28) According to the information processing device described in any of (21) to (27), the first direction is different from a direction in which a phase is detected.

(29) According to the information processing device described in any of (21) to (28), the first direction slants at an angle in a predetermined range with respect to a vertical direction in the captured image captured and acquired by the capturing unit.

(30) According to the information processing device described in (29), the range is between 40° to 50°.

(31) According to the information processing device described in any of (21) to (30), the corresponding-point detecting unit further detects the corresponding point with a captured image acquired by capturing a projected image of a fifth pattern including the first pattern including the repetition in the first cycles in the second direction, inverted in phase in the second cycles in the first direction, by the capturing unit, the projected image being projected on the projected surface by the projecting unit.

(32) According to the information processing device described in any of (21) to (31), the corresponding-point detecting unit detects the corresponding point with captured images acquired by capturing projected images of a plurality of the second patterns including the first patterns mutually shifted in phase, by the capturing unit, the projected images being projected onto the projected surface by the projecting unit.

(33) According to the information processing device described in (32), the corresponding-point detecting unit detects the corresponding point with captured images acquired by capturing projected images of a trio of the second patterns including the first patterns mutually shifted by 120° in phase, by the capturing unit, the projected images being projected onto the projected surface by the projecting unit.

(34) According to the information processing device described in any of (21) to (33), the corresponding-point detecting unit detects the corresponding point with captured images acquired by capturing projected images of a plurality of the second patterns including the first cycles different from each other, by the capturing unit, the projected images being projected onto the projected surface by the projecting unit.

(35) The information processing device described in any of (21) to (34), further includes: the capturing unit.

(36) The information processing device described in any of (21) to (35), further includes: the projecting unit.

(37) The information processing device described in any of (21) to (36), further includes: a projection control unit configured to control the projecting unit.

(38) The information processing device described in (37), further includes: a generating unit configured to generate the second pattern, and the projection control unit allows the projecting unit to project the second pattern generated by the generating unit.

(39) According to the information processing device described in (38), the generating unit inverts the first pattern including the repetition in the first cycles in the first direction, in phase in the second cycles in the second direction so as to generate the second pattern.

(40) According to the information processing device described in (38), the generating unit varies a repeating direction of the first pattern including the repetition in the first cycles to the first direction and further inverts the first pattern in phase in the second cycles in the second direction so as to generate the second pattern.

(41) The information processing device described in any of (38) to (40), further includes: a storage unit configured to store data of the first pattern, and the generating unit generates the second pattern with the data of the first pattern stored in the storage unit.

(42) An information processing method includes: detecting a corresponding point in pixel between a projecting unit and a capturing unit with a captured image acquired by capturing a projected image of a second pattern including a first pattern including repetition in first cycles in a first direction, inverted in phase in second cycles in a second direction orthogonal to the first direction, by the capturing unit.

<Projection Control: Pattern Rotation>

(51) An information processing device includes: a projection control unit configured to allow a projecting unit to project a predetermined pattern including repetition in predetermined cycles in a first direction different from a direction in which a phase is detected, in order to acquire corresponding relationship in pixel between the projecting unit and a capturing unit.

(52) According to the information processing device described in (51), the predetermined pattern includes a predetermined parameter sinusoidally varying.

(53) According to the information processing device described in (52), the parameter is luminance.

(54) According to the information processing device described in any of (51) to (53), the first direction slants at an angle in a predetermined range with respect to a vertical direction in a captured image captured and acquired by the capturing unit.

(55) According to the information processing device described in (54), the range is between 40° to 50°.

(56) According to the information processing device described in any of (51) to (55), the projection control unit further allows the projecting unit to project the predetermined pattern including the repetition in the predetermined cycles in a second direction orthogonal to the first direction.

(57) According to the information processing device described in any of (51) to (56), the projection control unit allows the projecting unit to project a plurality of the predetermined patterns mutually shifted in phase.

(58) According to the information processing device described in (57), the projection control unit allows images of a trio of the predetermined patterns mutually shifted by 120° in phase, to be projected.

(59) According to the information processing device described in any of (51) to (58), the projection control unit allows the projecting unit to project a plurality of the predetermined patterns including the predetermined cycles different from each other.

(60) The information processing device described in any of (51) to (59), further includes: a generating unit configured to generate the predetermined pattern including the repetition in the predetermined cycles in the first direction, and the projection control unit allows the projecting unit to project the predetermined pattern including the repetition in the predetermined cycles in the first direction, the predetermined pattern being generated by the generating unit.

(61) According to the information processing device described in (60), the generating unit varies a repeating direction of the predetermined pattern including the repetition in the predetermined cycles in the second direction, to the first direction so as to generate the predetermined pattern including the repetition in the predetermined cycles in the first direction.

(62) The information processing device described in (60) or (61), further includes: a storage unit configured to store data of the predetermined pattern, and the generating unit generates the predetermined pattern including the repetition in the predetermined cycles in the first direction, with the data of the predetermined pattern stored in the storage unit.

(63) The information processing device described in any of (51) to (62), further includes: the projecting unit configured to project the predetermined pattern including the repetition in the predetermined cycles in the first direction, onto a projected surface in accordance with the control of the projection control unit.

(64) The information processing device described in any of (51) to (63), further includes: the capturing unit configured to capture a projected image of the predetermined pattern including the repetition in the predetermined cycles in the first direction so as to acquire the captured image, the projected image being projected by the projecting unit.

(65) The information processing device described in any of (51) to (64), further includes: a corresponding-point detecting unit configured to detect a corresponding point in pixel between the projecting unit and the capturing unit, with the captured image of the projected image of the predetermined pattern including the repetition in the predetermined cycles in the first direction, the captured image being acquired by the capturing unit, the projected image being projected by the projecting unit.

(66) An information processing method includes: allowing a projecting unit to project a predetermined pattern including repetition in predetermined cycles in a first direction different from a direction in which a phase is detected, in order to acquire corresponding relationship in pixel between the projecting unit and a capturing unit.

<Corresponding-Point Detection: Pattern Rotation>

(71) An information processing device includes: a corresponding-point detecting unit configured to detect a corresponding point in pixel between a projecting unit and a capturing unit, with a captured image acquired by capturing a projected image of a predetermined pattern including repetition in predetermined cycles in a first direction different from a direction in which a phase is detected, by the capturing unit, the projected image being projected onto a projected surface by the projecting unit.

(72) According to the information processing device described in (71), the predetermined pattern includes a predetermined parameter sinusoidally varying.

(73) According to the information processing device described in (72), the parameter is luminance.

(74) According to the information processing device described in (72) or (73), the corresponding-point detecting unit acquires, as the phase, a variation in the parameter so as to detect the corresponding point on the basis of the phase.

(75) According to the information processing device described in any of (71) to (74), the first direction is different from the direction in which the phase is detected.

(76) According to the information processing device described in any of (71) to (75), the first direction slants at an angle in a predetermined range with respect to a vertical direction in the captured image captured and acquired by the capturing unit.

(77) According to the information processing device described in (76), the range is between 40° to 50°.

(78) According to the information processing device described in any of (71) to (77), the corresponding-point detecting unit further detects the corresponding point with a captured image acquired by capturing a projected image of the predetermined pattern including the repetition in the predetermined cycles in a second direction orthogonal to the first direction, by the capturing unit, the projected image being projected onto the projected surface by the projecting unit.

(79) According to the information processing device described in any of (71) to (78), the corresponding-point detecting unit detects the corresponding point with captured images acquired by capturing projected images of a plurality of the predetermined patterns mutually shifted in phase, by the capturing unit, the projected images being projected onto the projected surface by the projecting unit.

(80) According to the information processing device described in (79), the corresponding-point detecting unit detects the corresponding point with captured images acquired by capturing projected images of a trio of the predetermined patterns mutually shifted by 120° in phase, by the capturing unit, the projected images being projected onto the projected surface by the projecting unit.

(81) According to the information processing device described in any of (71) to (80), the corresponding-point detecting unit detects the corresponding point with captured images acquired by capturing projected images of a plurality of the predetermined patterns including the predetermined cycles different from each other, by the capturing unit, the projected images being projected onto the projected surface by the projecting unit.

(82) The information processing device described in any of (71) to (81), further includes: the capturing unit.

(83) The information processing device described in any of (71) to (82), further includes: the projecting unit.

(84) The information processing device described in any of (71) to (83), further includes: a projection control unit configured to control the projecting unit.

(85) The information processing device described in (84), further includes: a generating unit configured to generate the predetermined pattern including the repetition in the predetermined cycles in the first direction, and the projection control unit allows the projecting unit to project the predetermined pattern including the repetition in the predetermined cycles in the first direction, the predetermined pattern being generated by the generating unit.

(86) According to the information processing device described in (85), the generating unit varies a repeating direction of the predetermined pattern including the repetition in the predetermined cycles in the second direction, to the first direction so as to generate the predetermined pattern including the repetition in the predetermined cycles in the first direction.

(87) The information processing device described in (85) or (86), further includes: a storage unit configured to store data of the predetermined pattern, and the generating unit generates the predetermined pattern including the repetition in the predetermined cycles in the first direction, with the data of the predetermined pattern stored in the storage unit.

(88) An information processing method includes: detecting a corresponding point in pixel between a projecting unit and a capturing unit, with a captured image acquired by capturing a projected image of a predetermined pattern including repetition in predetermined cycles in a first direction different from a direction in which a phase is detected, the projected image being projected onto a projected surface by the projecting unit.

REFERENCE SINGS LIST

101 Sinusoidal pattern
102 Phase inverted pattern
103 Projected pattern
141 and 142 Region setting pattern
151 Projected pattern
152 Captured image
153 Asynchronous-noise generating region
154 Phase distribution
155 Asynchronous-noise generating region
156 Captured image
157 Asynchronous-noise generating region
158 Phase distribution
159 Asynchronous-noise generating region
171 Sinusoidal pattern
172 Rotated sinusoidal pattern
173 Phase inverted pattern
174 Projected pattern
181 and 182 Region setting pattern
200 Image projecting and capturing device
201 Projecting unit
202 Capturing unit
210 Projected surface
221 Control unit
231 CPU
232 ROM
233 RAM
234 Bus
240 Input/output interface
241 Input unit
242 Output unit
243 Storage unit
244 Communication unit
245 Drive
251 Removable medium
261 Video processor
262 Laser driver
263 Laser output unit
264 Mirror
265 MEMS driver
266 MEMS mirror
301 Pattern-rotation-level setting unit
302 Pattern generating unit
303 Projection control unit
304 Capture control unit
305 Corresponding-point detecting unit
400 Image projecting and capturing device
401 Image projecting and capturing device
402 Control device
410 Image projecting and capturing system
411 Projecting device
412 Capturing device
413 Control device
420 Image projecting and capturing system
421 Cable
422 Network
423 Control device

The invention claimed is:

1. An information processing device, comprising:
a projecting device;
a capturing device; and
circuitry configured to:
control the projecting device to project an image that includes a first pattern, wherein
the first pattern is inverted in phase in first cycles in a first direction,
the first pattern includes a second pattern repeated in second cycles in a second direction, and
the second direction is orthogonal to the first direction;
control the capturing device to capture the projected image that includes the first pattern; and
acquire, based on the captured image, a relationship between a pixel of the projecting device and a pixel of the capturing device.

2. The information processing device according to claim 1, wherein the second pattern includes a parameter that varies sinusoidally.

3. The information processing device according to claim 2, wherein the parameter is luminance.

4. The information processing device according to claim 1, wherein the circuitry is further configured to detect a phase in a third direction, and the third direction is different from the second direction.

5. The information processing device according to claim 1, wherein the second direction slants at an angle in a range with respect to a vertical direction in the captured image.

6. The information processing device according to claim 5, wherein the range is between 40° and 50°.

7. The information processing device according to claim 1, wherein the circuitry is further configured to control the projecting device to project:

a third pattern including repetition in the first cycles in the first direction, and a fourth pattern including the third pattern that is inverted in phase before the first pattern is projected.

8. The information processing device according to claim 7, wherein the third pattern and the fourth pattern include binary repeated in the first cycles in the first direction, and the binary includes mutually opposite phases.

9. The information processing device according to claim 1, wherein the circuitry is further configured to control the projecting device to project a fifth pattern, the fifth pattern includes the second pattern, the second pattern is repeated in the second cycles in the first direction, and the fifth pattern is inverted in phase in the first cycles in the second direction.

10. The information processing device according to claim 1, wherein the circuitry is further configured to control the projecting device to project a plurality of first patterns including a plurality of second patterns, and the plurality of second patterns is mutually shifted in phase.

11. The information processing device according to claim 10, wherein the circuitry is further configured to control the projecting device to project a trio of the plurality of first patterns including the plurality of second patterns, and the plurality of second patterns is mutually shifted by 120° in phase.

12. The information processing device according to claim 1, wherein the circuitry is further configured to control the projecting device to project images of a plurality of first patterns including the second cycles, and the second cycles are different from each other.

13. The information processing device according to claim 1, wherein the circuitry is further configured to:

generate the first pattern; and control the projecting device to project the generated first pattern.

14. The information processing device according to claim 13, wherein the circuitry is further configured to:

invert the second pattern in phase in the first cycles in the first direction; and generate the first pattern based on the inverted second pattern.

15. The information processing device according to claim 13, wherein the circuitry is further configured to:

vary a repeating direction of the second pattern;

invert the second pattern in phase in the first cycles in the first direction; and generate the first pattern based on the inverted second pattern.

16. The information processing device according to claim 11, further comprising:

a memory configured to store data of the plurality of second patterns, wherein the circuitry is further configured to generate the plurality of first patterns with the plurality of second patterns.

17. The information processing device according to claim 1, wherein the circuitry is further configured to control the projecting device to project the first pattern onto a projected surface.

18. The information processing device according to claim 1, wherein the circuitry is further configured to detect a corresponding point between the pixel of the projecting device and the pixel of the capturing device based on the captured image.

19. An information processing method, comprising:

controlling a projecting device to project an image that includes a first pattern, wherein the first pattern is inverted in phase in first cycles in a first direction, the first pattern includes a second pattern repeated in second cycles in a second direction, and the second direction is orthogonal to the first direction;

controlling a capturing device to capture the projected image that includes the first pattern; and acquiring, based on the captured image, a relationship between a pixel of the projecting device and a pixel of the capturing device.

* * * * *